(12) United States Patent
Otsuka

(10) Patent No.: US 11,674,857 B2
(45) Date of Patent: Jun. 13, 2023

(54) SEMICONDUCTOR DEVICE AND CAPACITANCE SENSOR DEVICE

(71) Applicant: LAPIS Semiconductor Co., Ltd., Yokohama (JP)

(72) Inventor: Masayuki Otsuka, Yokohama (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 303 days.

(21) Appl. No.: 17/076,994

(22) Filed: Oct. 22, 2020

(65) Prior Publication Data

US 2021/0131879 A1    May 6, 2021

(30) Foreign Application Priority Data

Oct. 30, 2019 (JP) .............................. JP2019-197712

(51) Int. Cl.
| | |
|---|---|
| *G01K 7/34* | (2006.01) |
| *G01K 15/00* | (2006.01) |
| *G01K 3/00* | (2006.01) |
| *H01G 4/228* | (2006.01) |

(52) U.S. Cl.
CPC ............. *G01K 7/343* (2013.01); *G01K 3/005* (2013.01); *G01K 15/005* (2013.01); *H01G 4/228* (2013.01)

(58) Field of Classification Search
CPC ...... G01K 7/343; G01K 3/005; G01K 15/005; H01G 4/228
USPC ....... 374/170, 178, 183, 184, 185, 100, 160, 374/109, 16, 28; 73/73
See application file for complete search history.

(56) References Cited

U.S. PATENT DOCUMENTS

| | | | | |
|---|---|---|---|---|
| 5,436,852 A | * | 7/1995 | Kon ......................... | G01W 1/17 236/91 C |
| 6,438,502 B1 | * | 8/2002 | Awtrey ..................... | G01K 7/13 374/163 |
| 7,542,285 B2 | * | 6/2009 | Colucci .................... | G06F 1/183 165/104.33 |
| 8,115,646 B2 | * | 2/2012 | Tanielian ................. | G01W 1/02 340/632 |

(Continued)

FOREIGN PATENT DOCUMENTS

| | | | | |
|---|---|---|---|---|
| CN | 103134837 A | * | 6/2013 | ........... G01N 27/223 |
| CN | 106092153 A1 | * | 5/2018 | |

(Continued)

*Primary Examiner* — Gail Kaplan Verbitsky
(74) *Attorney, Agent, or Firm* — Rabin & Berdo, P.C.

(57) ABSTRACT

A semiconductor device includes first and second electrode pads for externally connecting two electrodes of a sensor capacitor that has a capacitance that changes according to an environmental change. The semiconductor device further includes a capacitor having a pair of electrodes, one of the pair of electrodes being connected to the first electrode pad, a capacitance circuit having a reference capacitance, and a determination circuit that includes first and second relay terminals. The determination circuit is configured to send a charging current from the first relay terminal to the other electrode of the capacitor and send a charging current from the second relay terminal to the capacitance circuit, and determine whether or not the size of a potential of the first relay terminal is greater than the size of a potential of the second relay terminal, thereby determining whether a capacitance of the sensor capacitor has changed or not.

12 Claims, 18 Drawing Sheets

(56) References Cited

U.S. PATENT DOCUMENTS

| | | | |
|---|---|---|---|
| 9,618,653 B2 * | 4/2017 | Le Neel | G01P 5/14 |
| 11,346,873 B2 * | 5/2022 | Kurachi | G01R 27/2605 |
| 2014/0049273 A1 * | 2/2014 | Rocznik | G01D 5/24 324/679 |
| 2020/0292601 A1 * | 9/2020 | Kurachi | G01R 27/2605 |

FOREIGN PATENT DOCUMENTS

| | | | | |
|---|---|---|---|---|
| DE | 19983646 B3 | * | 6/2013 | G01L 9/0073 |
| DE | 102018124953 A1 | * | 5/2019 | G01K 1/20 |
| EA | 034860 B1 | * | 3/2020 | |
| JP | 2004145846 A | * | 5/2004 | |
| JP | 2007-333484 A | | 12/2007 | |
| JP | 6772670 B2 | * | 10/2020 | |
| KR | 101528687 B1 | * | 10/2013 | |
| RU | 2184369 C1 | * | 6/2002 | |
| RU | 2369863 C2 | * | 10/2009 | |

* cited by examiner

FIG. 6

| TEST | OPT2 | CIN0M | CIN0M2 | CIN0P | CIN1P | CIN1T | CIN0T | ITEST2 | ITESTB2 | CIN0TP |
|---|---|---|---|---|---|---|---|---|---|---|
| L | L | GROUND POTENTIAL | GROUND POTENTIAL | CONNECTED TO CIN0 | CONNECTED TO CIN1 | GROUND POTENTIAL | GROUND POTENTIAL | L | H | H |
| L | H | HiZ | CONNECTED TO CIN0 | GROUND POTENTIAL | GROUND POTENTIAL | CONNECTED TO CIN1 | GROUND POTENTIAL | H | L | |
| H | L | GROUND POTENTIAL | GROUND POTENTIAL | GROUND POTENTIAL | GROUND POTENTIAL | CONNECTED TO CIN1 | CONNECTED TO CIN0 | H | L | L |

SEMICONDUCTOR DEVICE AND CAPACITANCE SENSOR DEVICE

CROSS REFERENCE TO RELATED APPLICATIONS

This application is based upon and claims the benefit of priority of the prior Japanese Patent Application No. 2019-197712, filed on Oct. 30, 2019, the entire contents of which are incorporated herein by reference.

TECHNICAL FIELD

The present invention relates to a semiconductor device including a capacitance sensor circuit that detects a change in capacitance of a capacitor, and a capacitance sensor device.

BACKGROUND ART

An IC (integrated circuit) tag having the function of detecting a history of changes in ambient temperatures to which a product in transit or storage has been exposed, and wirelessly transmitting the detected information has been proposed (for example, Japanese Patent Application Laid-open Publication No. 2007-333484).

The IC tag uses a capacitor filled with solid wax between electrodes as a dielectric, and an absorbing portion that absorbs liquid wax when the wax is liquefied, as a sensor for detecting a change in ambient temperature. That is, in the capacitor, if the ambient temperature becomes high enough to reach the melting point of the wax, the wax filled between the electrodes of the capacitor is liquefied and absorbed by the absorbing portion. As a result, an area between the electrodes in the capacitor is filled with air. When this occurs, because the dielectric constant of air is lower than that of wax, the capacitance of the capacitor decreases and the impedance increases.

The IC tag is equipped with a circuit that detects this impedance as the capacitance of the capacitor, and wirelessly transmits data indicating the detection result.

The data wirelessly transmitted from the IC tag is received by a prescribed receiver. The receiver compares the received detection result, or the impedance value of the capacitor, with a prescribed threshold value, and determines whether the wax has been melted or not. If the receiver determines the wax has been melted, this confirms that the product, as of that point in time, has been exposed to an ambient temperature higher than the melting point of the wax.

SUMMARY OF THE INVENTION

Problems to be Solved by the Invention

In the IC tag described in Japanese Patent Application Laid-open Publication No. 2007-333484, in order to detect the impedance of the capacitor as the capacitance of the capacitor, it is necessary to charge the capacitor by supplying a current for detection to the capacitor.

Thus, if a capacitor with a large capacitance is used, a current consumed for detection would increase.

In an IC tag of a type that receives power through wireless power supply, however, a power supply circuit has a lower current supply capacity. Therefore, if a current consumed to detect the capacitance of the capacitor is large, or the charging speed for the capacitor is high, the power supply potential decreases, which could cause malfunction.

The present invention aims at providing a semiconductor device and a capacitance sensor device that can detect a change in capacitance of the capacitor while suppressing an increase in consumption current, even when a capacitor having a large capacitance is used as a capacitor that changes the capacitance thereof according to environmental changes.

A semiconductor device according to the present invention includes: a first electrode pad and a second electrode pad for externally connecting a first electrode and a second electrode of a sensor capacitor that changes a capacitance thereof according to an environmental change; a capacitor having a pair of electrodes, one of the pair of electrodes being connected to the first electrode pad; a capacitance circuit having a reference capacitance; and a determination circuit that includes a first relay terminal and a second relay terminal, wherein the determination circuit is configured to: send a charging current from the first relay terminal to the other of the pair of electrodes of the capacitor; compare a size of a potential of the first relay terminal and a size of a potential of the second relay terminal; and determine whether the capacitance of the sensor capacitor has changed or not based on the comparison result.

A semiconductor device according to the present invention includes: a first electrode pad and a second electrode pad for externally connecting two electrodes at both ends of a series circuit in which a sensor capacitor that changes a capacitance thereof according to an environmental change and a first capacitor are connected in series; a capacitance circuit having a reference capacitance; and a determination circuit that includes a first relay terminal and a second relay terminal, wherein the determination circuit is configured to: send a charging current from the first relay terminal to one of the two electrodes at both ends of the series circuit; compare a size of a potential of the first relay terminal and a size of a potential of the second relay terminal; and determine whether the capacitance of the sensor capacitor has changed or not based on the comparison result.

A capacitance sensor device according to the present invention includes: a sensor capacitor that changes a capacitance thereof according to an environmental change; a capacitor having a pair of electrodes, one of the pair of electrodes being connected to one of electrodes of the sensor capacitor; a capacitance circuit having a reference capacitance; and a determination circuit that includes a first relay terminal and a second relay terminal, wherein the determination circuit is configured to: send a charging current from the first relay terminal to the other of the pair of electrodes of the capacitor; compare a size of a potential of the first relay terminal and a size of a potential of the second relay terminal; and determine whether the capacitance of the sensor capacitor has changed or not based on the comparison result.

In the present invention, in determining whether the capacitance of the sensor capacitor has changed or not based on the potential when the sensor capacitor that changes a capacitance thereof according to an environmental change is charged, a capacitor is connected to the sensor capacitor in series and by supplying a charging current to the series circuit, the sensor capacitor is charged.

This makes it possible to keep the combined capacitance of the series circuit lower than the capacitance of the sensor capacitor. As a result, even when a capacitor with a relatively large capacitance is used for the sensor capacitor, it is possible to detect a change in capacitance of the sensor capacitor while suppressing the current amount of the charging current that flows through the series circuit during the charging operation.

BRIEF DESCRIPTION OF THE DRAWINGS

FIG. 6 is a diagram showing an operation of a switching circuit SW.

DETAILED DESCRIPTION OF EMBODIMENTS

Figure 1:
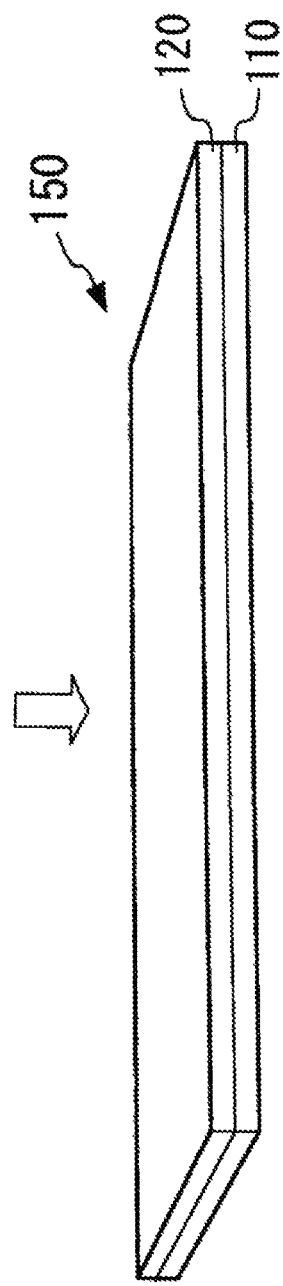
FIG. 1 is a perspective view showing an exterior of a sensor tag 150 including a capacitance sensor device.

Preferred embodiments of the present invention will be described in detail below. In the descriptions of respective embodiments below and appended diagrams, the same reference characters are given to parts that are substantially the same as each other or equivalent to each other.

FIG. 1 is a perspective view showing an exterior of the sensor tag 150 including a capacitance sensor device of the present invention. The sensor tag 150 is a passive-type RFID (radio frequency identification) IC tag, for example, having the function of determining whether the sensor tag has been exposed to an ambient temperature higher than a prescribed temperature or not, and wirelessly transmitting the determination result.

The sensor tag 150 includes a substrate 110 having a plurality of devices formed on one surface, and a protective plate 120 attached to that one surface to cover the plurality of devices. The substrate 110 and the protective plate 120 are each a flexible substrate made of PET (polyethylene terephthalate) or the like, for example.

Figure 2:
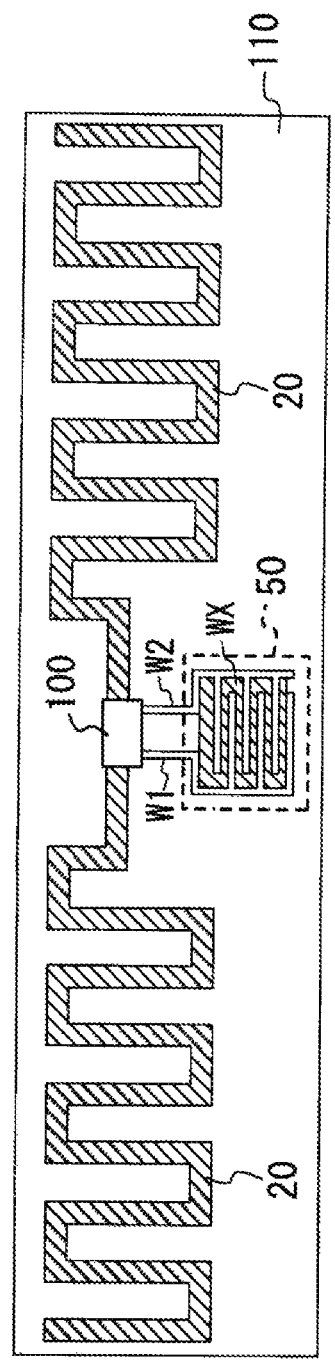
FIG. 2 is a plan view of a device formed on the surface of a substrate 110, seen through a protective plate 120 of the sensor tag 150.

FIG. 2 is a plan view of the devices formed on the surface of the substrate 110, seen through a protective plate 120 of the sensor tag 150 from the arrow of FIG. 1.

As illustrated in FIG. 2, on one surface of the substrate 110, a plurality of devices such as an IC (integrated circuit) chip 100, an antenna 20, a sensor capacitor 50, and the like.

The antenna 20 is made of a conductive wiring material, for example, and is connected to electrode pads of the IC chip 100, which is a semiconductor device.

The sensor capacitor 50 has the structure in which the capacitance thereof changes irreversibly according to the ambient temperatures, and functions as a temperature sensor that detects a change in ambient temperatures based on a change in the capacitance.

For example, as illustrated in FIG. 2, the sensor capacitor 50 includes comb-shaped electrodes W1 and W2 arranged on one surface of the substrate 110 along the one surface, and wax WX filled between the respective comb teeth of the electrodes W1 and W2. The electrodes W1 and W2 have a comb-shaped planar pattern where the respective comb teeth are alternately arranged, facing each other in a parallel manner. The wax WX acts as the dielectric of the capacitor. The wax WX maintains the solid state when the ambient temperature does not exceed a prescribed melting point, and liquefies when the ambient temperature exceeds the melting point. Thus, if the sensor capacitor 50 is exposed to an ambient temperature higher than the melting point, the wax WX, which is the dielectric, liquefies and flows out from the electrodes W1 and W2, which lowers the capacitance of the sensor capacitor 50.

As a result, the sensor capacitor 50 as the temperature sensor has the first capacitance of a prescribed level when the ambient temperature is equal to or lower than a prescribed temperature (melting point of the wax), and has the second capacitance lower than the first capacitance when the ambient temperature is higher than the prescribed temperature. After that, even if the ambient temperature returns to the melting point of the wax WX or lower, the wax WX that has flowed out does not return, and therefore, the sensor capacitor 50 maintains the second capacitance described above.

One end of each of the electrodes W1 and W2 of the sensor capacitor 50 is connected to an electrode pad (described later) that acts as an external terminal of the IC chip 100.

Figure 3:
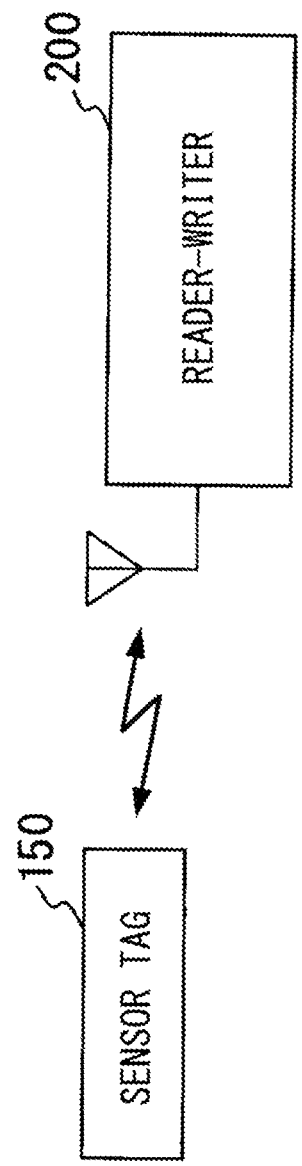
FIG. 3 is a diagram showing a configuration to perform wireless communication between the sensor tag 150 and a reader-writer 200.

The IC chip 100 included in the sensor tag 150 has a circuit that is configured to detect the capacitance of the sensor capacitor 50 and wirelessly transmit various types of information and an identification ID based on the capacitance to the reader-writer 200 as illustrated in FIG. 3. The various types of information based on the capacitance of the sensor capacitor 50 includes information indicating whether or not the IC ship 100 has been exposed to an ambient temperature higher than a prescribed temperature, information indicating the capacitance, and the like.

Figure 4:
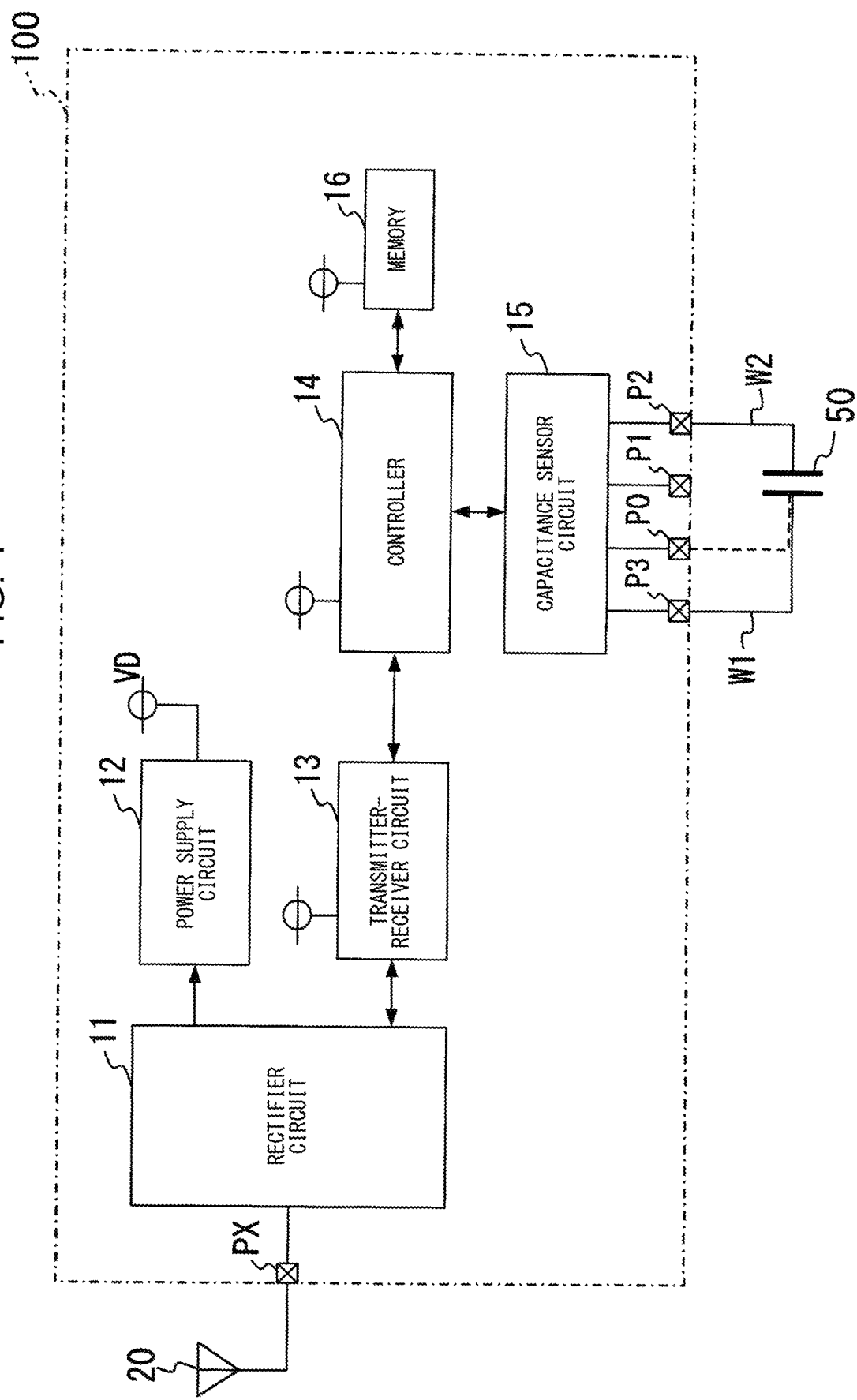
FIG. 4 is a block diagram showing a configuration of a circuit formed in an IC chip 100.

FIG. 4 is a block diagram showing a configuration of a circuit formed in an IC chip 100.

As illustrated in FIG. 4, in the IC chip 100, a rectifier circuit 11, a power supply circuit 12, a transmitter-receiver circuit 13, a controller 14, a non-volatile memory 16 storing the identification ID thereof, and a capacitance sensor circuit 15 are formed.

The rectifying circuit 11 has the antenna 20 connected thereto via an electrode pad PX. The antenna 20 receives a high-frequency signal indicating reception information (including command codes) obtained by receiving wireless radio waves emitted from the reader-writer 200, and a high frequency current for wireless power supply via the electrode pad PX, and supplies the signal and current to the rectifier circuit 11.

The rectifier circuit 11 supplies a DC voltage obtained by rectifying the high-frequency current to the power supply circuit 12, and supplies a reception signal obtained by rectifying and inspecting the high-frequency signal to the transmitter-receiver circuit 13. The rectifier circuit 11 supplies a modulation signal supplied from the transmitter-receiver circuit 13 to the antenna 20.

The power supply circuit 12 generates a power supply voltage VD having a constant voltage value based on the DC voltage supplied from the rectifier circuit 11, and supplies the power supply voltage VD to the transmitter-receiver circuit 13, the controller 14, the memory 16, and the capacitance sensor circuit 15. By receiving the power supply voltage VD, the transmitter-receiver circuit 13, the controller 14, the memory 16, and the capacitance sensor circuit 15 each perform operations described below.

The transmitter-receiver circuit 13 acquires a command code by performing a demodulation process on the received signal supplied from the rectifier circuit 11, and supplies the command code to the controller 14. The transmitter-receiver circuit 13 supplies, to the rectifier circuit 11, a modulation signal obtained by modulating a carrier signal corresponding to the UHF band, the HF (High Frequency) band, or the LF (Low Frequency) band used in short-range wireless communication with the transmission information supplied from the controller 14.

The controller 14 reads out and takes in the identification ID stored in the memory 16.

Furthermore, the controller 14 supplies, to the capacitance sensor circuit 15, various control signals for detecting the capacitance of the sensor capacitor 50 externally connected to the IC chip 100.

The capacitance sensor circuit 15 compares the size of the capacitance of the sensor capacitor 50 with the size of the reference capacitance according to the various control signals. Then, the capacitance sensor circuit 15 determines whether or not the capacitance of the sensor capacitor 50 has changed from the first capacitance to the second capacitance, which is lower than the first capacitance, based on the comparison results. The capacitance sensor circuit 15 supplies this determination result to the controller 14.

Based on the determination result, the controller 14 generates temperature change information indicating whether or not the sensor tag 150 has been exposed to an ambient temperature higher than a predetermined temperature, and supplies, to the transmitter-receiver circuit 13, the temperature change information and information including the identification ID thereof as the transmission information.

As a result, the sensor tag 150 wirelessly transmits the temperature change information indicating whether the sensor tag 150 has been exposed to an ambient temperature higher than a prescribed temperature or not and the identification ID to the reader-writer 200 as illustrated in FIG. 3.

Below, the configuration of the capacitance sensor circuit 15 will be explained in detail.

The capacitance sensor circuit 15 is connected to the electrode pads P0 to P3 as external terminals of the IC chip 100 as illustrated in FIG. 4. The electrode pads P0 to P3 are so-called bonding pads, and all have the same parasitic capacitance value.

Among the electrode pads P0 to P3, the electrode pads P0 and P3 are electrode pads for external connection of the electrode W1, which is one of the electrodes W1 and W2 of the sensor capacitor 50 described above. The electrode pad P2 is an electrode pad for external connection of the electrode W2, which is the other of the electrodes W1 and W2 of the sensor capacitor 50.

The electrode pad P0 is an electrode pad for connecting the electrode W1 of the sensor capacitor 50 when a capacitance of the sensor capacitor 50 is relatively small. On the other hand, the electrode pad P3 is an electrode pad for connecting the electrode W1 of the sensor capacitor 50 when a capacitance of the sensor capacitor 50 is relatively large.

Figure 5:
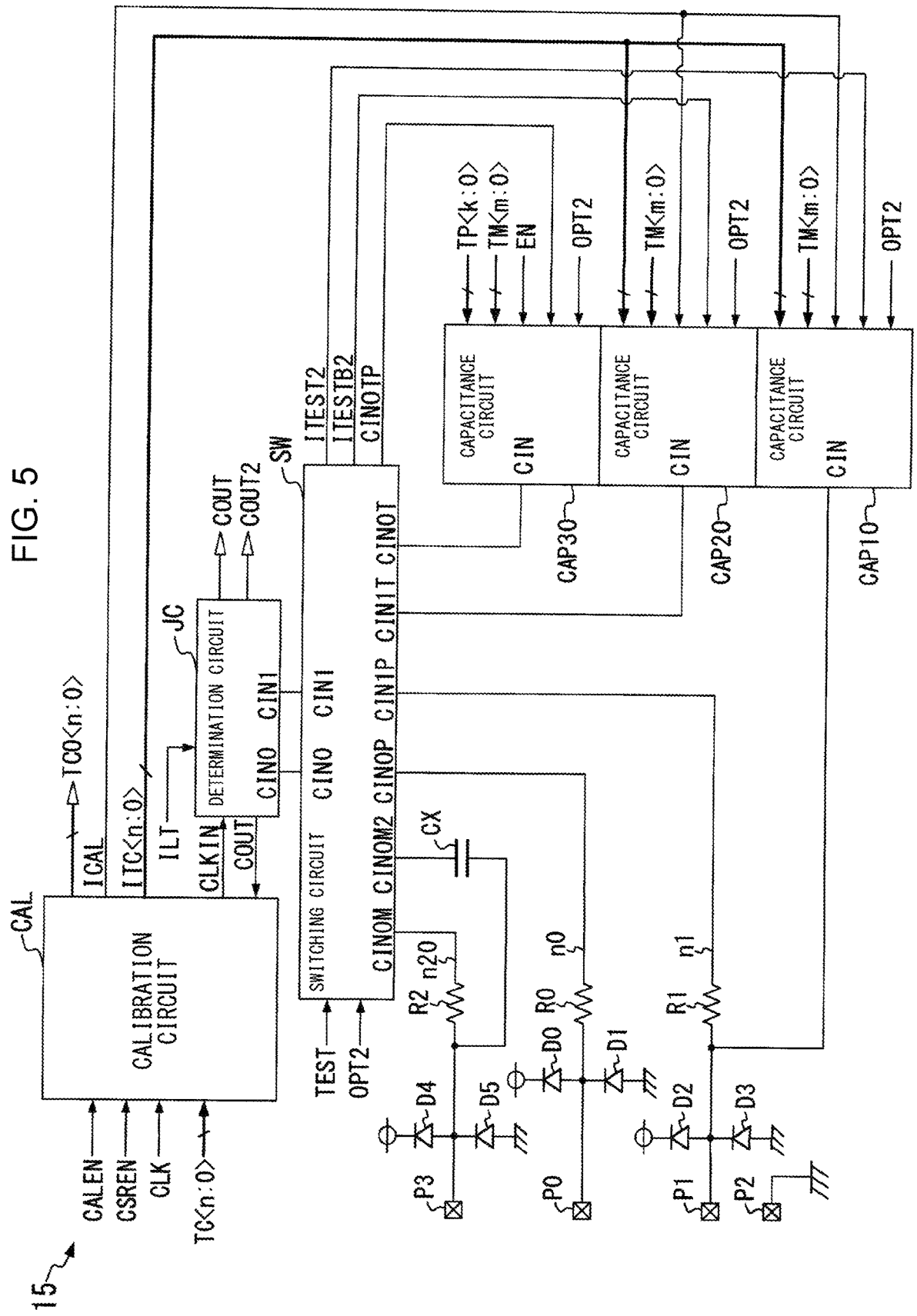
FIG. 5 is a block diagram showing the configuration of a capacitance sensor circuit 15.

FIG. 5 is a block diagram showing the configuration of a capacitance sensor circuit 15.

The capacitance sensor circuit 15 includes diodes D0 to D5, resistors R0 to R2, a calibration circuit CAL, a determination circuit JC, a switching circuit SW, an auxiliary capacitor CX, a first capacitance circuit CAP10, a second capacitance circuit CAP20, and a third capacitance circuit CAP30.

The anode of the diode D0, the cathode of the diode D1, and one end of the resistor R0 are connected to the electrode pad P0. The cathode of the diode D0 receives the power supply voltage, and the anode of the diode D1 is grounded. The other end of the resistor R0 is connected to the input terminal CIN0P of the switching circuit SW via a node n0.

The anode of the diode D2, the cathode of the diode D3, a capacitance connecting terminal CIN of the first capacitance circuit CAP10, and one end of the resistor R1 are connected to the electrode pad P1. The cathode of the diode D2 receives the power supply voltage, and the anode of the diode D3 is grounded. The other end of the resistor R1 is connected to an input terminal CIN1P of the switching circuit SW via a node n1.

The electrode pad P2 is grounded.

The anode of the diode D4, the cathode of the diode D5, one end of the resistor R2, and one end of the auxiliary capacitor CX are connected to the electrode pad P3. The cathode of the diode D4 receives the power supply voltage, and the anode of the diode D5 is grounded. The other end of the resistor R2 is connected to an input terminal CIN0M of the switching circuit SW via a node n20, and the other end of the auxiliary capacitor CX is connected to an input terminal CIN0M2 of the switching circuit SW.

There is no special limitation on the structure of the auxiliary capacitor CX, and a MIM (Metal-Insulator-Metal) capacitor, a MOM (Metal Oxide Metal) capacitor, or a MOS (Metal Oxide Semiconductor) capacitor may be used, for example. Diodes in which the parasitic capacitance of the cathode and the parasitic capacitance of the anode are all the same are used for the diodes D0 to D5. The resistance value of the resistors R0 to R2 is the same as each other.

The diodes D0 to D5 and the resistors R0 to R2 described above constitute a protection circuit to protect the internal circuits (SW, JC, CAL, CAP10, CAP20, and CAP30) from static electricity entering the IC chip 100 from outside through the electrode pads P0 to P3. Furthermore, because the parasitic capacitance of each of the resistors R0 to R2 and the nodes n0, n1, and n20 acts as a filter, a high degree of resistance to noise entering the IC chip 100 from outside through the electrode pads P0, P1, and P3 is achieved.

The input terminal CIN1T of the switching circuit SW is connected to the capacitance connection terminal CIN of the second capacitance circuit CAP20, and the input terminal CIN0T of the switching circuit SW is connected to the capacitance connection terminal CIN of the third capacitance circuit CAP30.

The switching circuit SW receives a test mode signal TEST and a switching signal OPT2 from the controller 14, and each of the signals has two levels (ground potential and power supply potential, for example). Below, the higher of the two will be referred to as H level, and the lower of the two will be referred to as L level. The switching circuit SW sets the status of the input terminals CIN0M, CIN0M2, CIN0P, CIN1P, CIN1T, and CIN0T based on the test mode signal TEST and the switching signal OPT2. Also, the switching circuit SW generates a binary test signal ITEST2, inverted test signal ITESTB2, and a signal CIN0TP based on the test mode signal TEST and the switching signal OPT2.

The test mode signal TEST is at H level when a test to be conducted to determine whether or not the detection operation and calibration (described below) by the capacitance sensor circuit 15 are normally performed by the IC chip 100 alone, and is at L level in any other cases. The switching signal OPT2 is at L level when the sensor capacitor 50 is to be connected between the electrode pads P2 and P0 of the IC chip 100, and is at H level when the sensor capacitor 50 is to be connected between the electrode pads P2 and P3.

FIG. 6 is a diagram showing an operation of the switching circuit SW.

That is, if the test mode signal TEST and the switching signal OPT2 are both at L level, the switching circuit SW sets the status of the input terminals CIN0M, CIN0M2, CIN1T and CIN0T to the ground potential. Furthermore, the switching circuit SW connects the input terminal CIN0P to the first relay terminal CIN0 thereof, and the input terminal CIN1P to the second relay terminal CIN1 thereof.

If the test mode signal TEST is at H level and the switching signal OPT2 is at L level, the switching circuit SW sets the status of the input terminal CIN0M to a high impedance state, and sets the status of the input terminals CIN0P, CIN1P and CIN0T to the ground potential. Furthermore, the switching circuit SW connects the input terminal CIN0M2 to the relay terminal CIN0, and the input terminal CIN1T to the relay terminal CIN1.

If the test mode signal TEST is at H level and the switching signal OPT2 is at L level, the switching circuit SW sets the status of the input terminals CIN0M, CIN0M2, CIN0P and CIN1P to the ground potential. Furthermore, the switching circuit SW connects the input terminal CIN1T to the relay terminal CIN1, and the input terminal CIN0T to the relay terminal CIN0.

The switching circuit SW generates the test signal ITEST2. The test signal ITEST2 is set to the L level when both the test mode signal TEST and the switching signal OPT2 are at L level, and to the H level when one of the TEST and OPT2 is at L level. The switching circuit SW supplies the test signal ITEST2 to the first capacitance circuit CAP10, and supplies, to the second capacitance circuit CAP20, the inverted test signal ITESTB2 that is the test signal ITEST2 with the level being inverted (from L to H, or H to L).

The switching circuit SW generates the signal CIN0TP, which is set to the L level when the test mode signal TEST is at H level and the switching signal OPT2 is at L level, and is set to the H level in any other cases. The switching circuit SW supplies the signal CIN0TP to the first capacitance circuit CAP30.

The relay terminal CIN0 of the switching circuit SW is connected to a relay terminal CIN0 of the determination circuit JC, and the relay terminal CIN1 of the switching circuit SW is connected to a relay terminal CIN1 of the determination circuit JC.

The determination circuit JC charges and discharges the sensor capacitor 50 via the relay terminal CIN0, the node n0 (or n20), the resistor R0 (or R2), and the electrode pad P0 (or P3). The determination circuit JC also charges and discharges the capacitance circuit CAP10 via the relay terminal CIN1, the node n1 and the resistor R1. The determination circuit JC also charges and discharges the capacitance circuit CAP20 via the relay terminal CIN1. The determination circuit JC also charges and discharges the capacitance circuit CAP30 via the relay terminal CIN0.

The determination circuit JC compares the size of the potential of the relay terminal CIN0 generated by charging and discharging the sensor capacitor 50 with the size of the potential of relay terminal CIN1 generated by charging and discharging the capacitance circuit CAP10 (or CAP20). The determination circuit JC determines whether the capacitance of the sensor capacitor 50 has changed from the first capacitance to the second capacitance based on the comparison result, and supplies a detection signal COUT indicating the determination result to the calibration circuit CAL and the controller 14. The determination circuit JC determines whether a difference between the potential of the relay terminal CIN0 and the potential of the relay terminal CIN1 is smaller than a prescribed value or not, or whether or not the two are substantially the same, and supplies a flag signal COUT2 indicating the determination result to the controller 14.

The determination circuit JC conducts a leak test according to a leak test signal ILT supplied from the controller 14.

Figure 7:
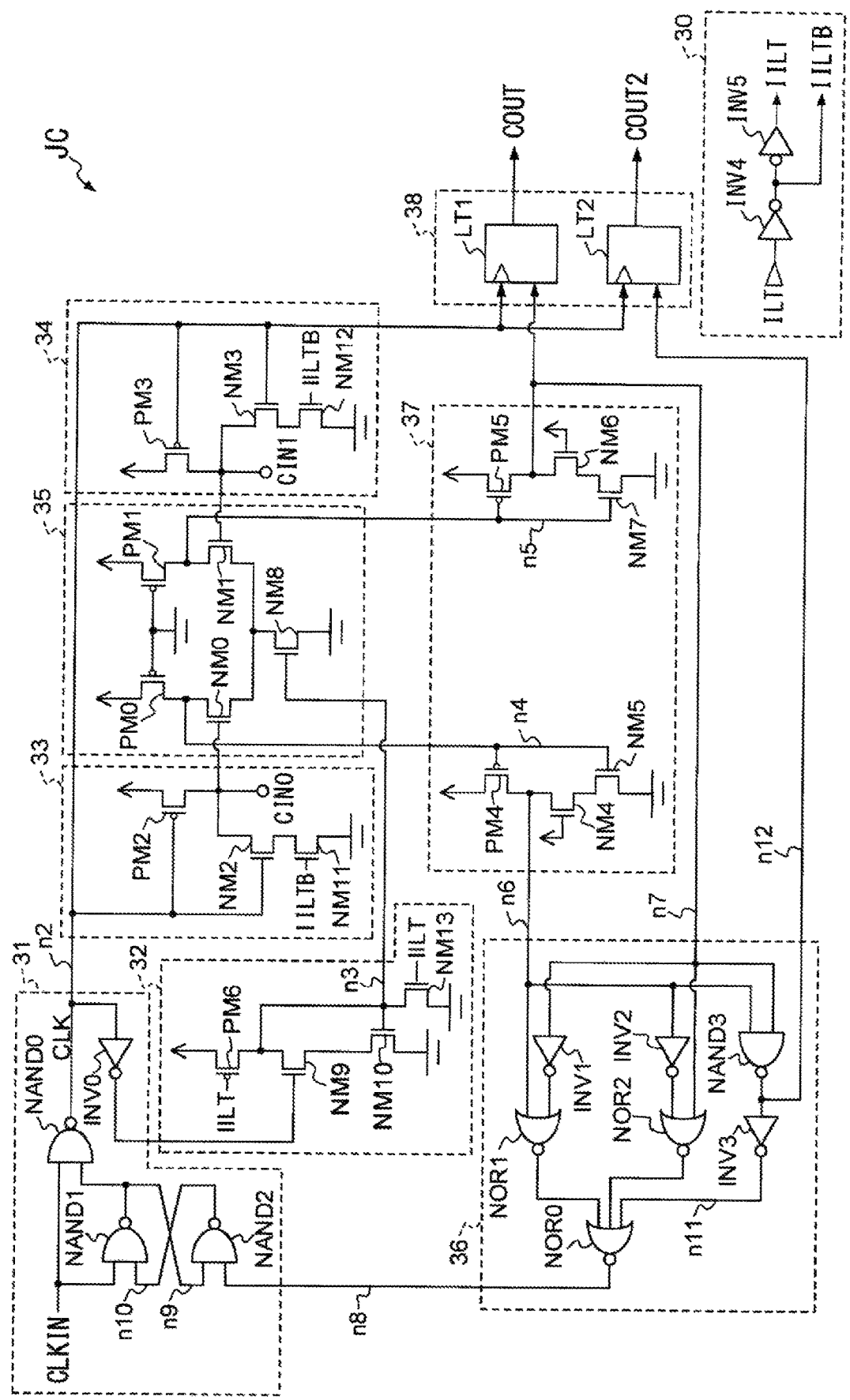
FIG. 7 is a circuit diagram showing a configuration of a determination circuit JC.

FIG. 7 is a circuit diagram showing the configuration of the determination circuit JC.

As illustrated in FIG. 7, the determination circuit JC includes a leak test reception unit 30, a control unit 31, a bias signal generation unit 32, a first current supply unit 33, a second current supply unit 34, a differential amplifier unit 35, a timing generation circuit 36, an inverter unit 37, and a data latch unit 38.

The leak test reception unit 30 is constituted of an inverter INV4 and an inverter INV5. The output terminal of the inverter INV4 is connected to the input terminal of the inverter INV5.

The inverter INV4 receives the leak test signal ILT at the input terminal thereof, and supplies an inverted signal IILTB obtained by inverting the level of the leak test signal ILT to the current supply units 33 and 34, and to the inverter INV 5. The inverter INV5 supplies a control signal IILT obtained by inverting the level of the inverted signal IILTB to the bias signal generation unit 32.

The control unit 31 is constituted of NAND0, NAND1, NAND2, and an inverter INV0.

NAND0, NAND1 and NAND2 are 2-input NAND gate circuits that output NAND logic. NAND0 receives a clock signal CLKIN at one input terminal thereof. NAND1 and NAND2 constitute a flip-flop circuit. NAND1 receives a clock signal CLKIN at one input terminal thereof. The output terminal of NAND1 is connected to the other input terminal of NAND0. One input terminal of NAND2 is connected to the output terminal of NAND1 and the other input terminal of NAND0 via a node n9. The output terminal of NAND2 is connected to the other input terminal of NAND1 via a node n10. NAND0 maintains the L level state during a period in which the output of NAND1 is at the H level, and outputs a clock signal CLK, which is the clock signal CLKIN with the level inverted, to the node n2 during a period in which the output of NAND1 is at the L level. The input terminal of an inverter INV0 is connected to the output terminal of NAND0 via the node n2. The inverter INV0 supplies an inverted clock signal obtained by inverting the level of the output signal of NAND0 received at the input terminal thereof to the bias signal generation unit 32.

The bias signal generation unit 32 includes a transistor PM6, a transistor NM9, a transistor NM10, and a transistor NM13.

The transistor PM6 is a P-channel type MOSFET (metal oxide semiconductor field effect transistor). The source of the transistor PM6 is connected to the power supply and the drain thereof is connected to a node n3. The transistor PM6 receives the control signal IILT at the gate thereof. The transistors NM9, NM10, and NM13 are each an N-channel type MOSFET, which is the second conductive type transistor. The transistor NM9 receives the inverted clock signal outputted from the inverter INV0 at the gate thereof. The drain of the transistor NM9 is connected to the node n3, and the source thereof is connected to the drain of the transistor NM10. The source of the transistor NM10 is grounded and the gate thereof is connected to the node n3. As noted previously, the transistor NM13 is an N-channel MOSFET. In the transistor NM13, the source is grounded, the drain is connected to the node n3, and the gate receives the control signal IILT.

The current supply unit 33 includes transistors PM2, NM2, and NM11.

The transistors PM2 is a P-channel type MOSFET, which is the first conductive type transistor. The source of the transistor PM2 is connected to the power supply, and the gate is connected to the node n2. The drain of the transistor PM2 is connected to the relay terminal CIN0. The transistors NM2 and NM11 are each an N-channel type MOSFET, which is the second conductive type transistor. The gate of the transistor NM2 is connected to the node n2, and the drain is connected to the relay terminal CIN0. The source of the transistor NM2 is connected to the drain of the transistor NM11. The source of the transistor NM11 is grounded and the gate receives the inverted signal IILTB.

The current supply unit 34 includes transistors PM3, NM3, and NM12.

The transistor PM3 is a P-channel type MOSFET, which is the first conductive type transistor. The source of the transistor PM3 is connected to the power supply, and the gate is connected to the node n2. The drain of the transistor PM3 is connected to the relay terminal CIN1. The transistors NM3 and NM12 are each an N-channel type MOSFET, which is the second conductive type transistor. The gate of the transistor NM3 is connected to the node n2, and the drain is connected to the relay terminal CIN1. The source of the transistor NM3 is connected to the drain of the transistor NM12. The source of the transistor NM12 is grounded and the gate receives the inverted signal IILTB.

The differential amplifier unit 35 is a differential amplifier circuit that amplifies and outputs the potential difference between the relay terminals CIN0 and CIN1. The differential amplifier unit 35 includes transistors PM0, PM1, NM0, NM1 and NM8.

The transistors PM0 and PM1 are each a P-channel type MOSFET, which is the first conductive type transistor. In the transistors PM0 and PM1, the respective sources are connected to the power supply, and the respective gates are connected to each other, and are commonly grounded. The drain of the transistor PM0 is connected to a node n4 and the drain of the transistor NM0. The drain of the transistor PM1 is connected to a node n5 and the drain of the transistor NM1.

The transistors NM0, NM1, and NM8 are each an N-channel type MOSFET, which is the second conductive type transistor. The gate of the transistor NM0 is connected to the drain of the transistor PM2 and the drain of the transistor NM2, and also to the relay terminal CIN0. The gate of the transistor NM1 is connected to the drain of the transistor PM3 and the drain of the transistor NM3, and also to the relay terminal CIN1.

In the transistor NM8, the source is grounded, and the drain is connected to the respective sources of the transistors NM0 and NM1. The gate of the transistor NM8 is connected to the node n3, and is connected to the gate of the transistor NM10, the drain of the transistor PM6, and the drain of the transistor NM9 via the node n3. The transistor NM8 has the function of a constant current source circuit. The constant current (tail current) sent from the transistor NM8 as the constant current source circuit is controlled by the bias signal (that is, the potential of the node n3) from the bias signal generation unit 32.

The timing generation circuit 36 includes NOR0, NOR1, NOR2, NAND3, an inverter INV1, an inverter INV2, and an inverter INV3.

The input terminal of the inverter INV1 is connected to a node n7. The inverter INV1 supplies, to NOR1, an inverted signal obtained by inverting the level of the signal of the node n7. The input terminal of the inverter INV2 is connected to a node n6. The inverter INV2 supplies, to NOR2, an inverted signal obtained by inverting the level of the signal of the node n6.

NOR1 and NOR2 are 2-input NOR gate circuits that output NOR. One input terminal of NOR1 is connected to the node n6, to which the input terminal of the inverter INV2 is also connected. The other input terminal of NOR1 is connected to the output terminal of the inverter INV1. NOR1 supplies, to NOR6, a signal of NOR of the signal of the node n6 and the inverted signal output from the inverter INV1.

One input terminal of NOR2 is connected to the node n7, to which the input terminal of the inverter INV1 is also connected. The other input terminal of NOR2 is connected to the output terminal of the inverter INV2. NOR2 supplies, to NOR0, NOR of a signal of the node n7 and the inverted signal output from the inverter INV2.

NAND3 is a 2-input NAND gate circuit that outputs NAND. One input terminal of NAND3 is connected to the node n6. The other input terminal of NAND3 is connected to the node n7. NAND3 supplies a signal indicating NAND of the signal on the node n6 and the signal on the node n7 to the inverter INV3, and also supplies this signal to the data latch unit 38 via a node n12.

The inverter INV3 supplies a signal obtained by inverting the level of the signal output from the NAND3 to NOR0 via a node n11.

NOR0 is a 3-input NOR gate circuit that outputs NOR. NOR0 supplies a signal indicating the resultant NOR of the signals output from NOR1, NOR2 and the inverter INV3, respectively, to NAND2 of the control unit 31 via a node n8.

The inverter unit 37 is a circuit unit that inverts and outputs the output signal from the differential amplifier unit 35. The inverter unit 37 includes transistors PM4, PM5, NM4, NM5, NM6, and NM7.

The transistors PM4 and PM5 are P-channel type MOSFETs, which are the first conductivity type transistors, and the transistors NM4 to NM7 are N-channel type MOSFETs, which are the second conductivity type transistors.

The source of the transistor PM4 is connected to the power supply and the gate thereof is connected to the node n4. The gate of the transistor NM4 is connected to the power supply, and the drain thereof is connected to the node n6 together with the drain of the transistor PM4. The transistor NM5 is an N-channel type MOSFET, which is the first conductivity type transistor. In the transistor NM5, the source is grounded, the drain is connected to the source of the transistor NM4, and the gate of connected to the node n4.

The source of the transistor PM5 is connected to the power supply and the gate thereof is connected to the node n5. The gate of the transistor NM6 is connected to the power supply, and the drain thereof is connected to the node n7 together with the drain of the transistor PM5. In the transistor NM7, the source is grounded, the drain is connected to the source of the transistor NM6, and the gate is connected to the node n5.

With the configuration of the differential amplifier unit 35 and the inverter unit 37 described above, a signal indicating whether or not the potential of the relay terminal CIN1 is higher than the potential of the relay terminal CIN0 is output to the node n6. A signal indicating whether or not the potential of the relay terminal ON0 is higher than the potential of the relay terminal CIN1 is also output to the node n7.

The transistors PM0 and PM1 described above are formed to have the same dimensions (such as the gate length and gate width). Similarly, the transistors PM2 and PM3, PM4 and PM5, NM0 and NM1, NM2 and NM3, NM4 and NM6, and NM5 and NM7 are formed to have the same dimensions, respectively.

The data latch unit 38 includes the first latch circuit LT1 and the second latch circuit LT2.

A clock terminal of each of the latch circuits LT1 and LT2 is supplied with a clock signal CLK via the node n2. A signal input terminal of the latch circuit LT1 is connected to the node n7, and a signal input terminal of the latch circuit LT2 is connected to the node n12.

The latch circuit LT1 takes in a signal of the node n7 when the clock signal CLK is at the L level.

Then, when the clock signal CLK changes from the L level to the H level, the latch circuit LT1 outputs a signal obtained by inverting the signal level of the node n7 that was taken immediately before that point as a detection signal COUT that indicates whether or not the capacitance of the sensor capacitor 50 has changed from the first capacitance to the second capacitance, which is lower than the first capacitance. Thereafter, the latch circuit LT1 maintains that signal level and outputs the signal level as the detection signal COUT until the clock signal changes from the L level to the H level again.

The latch circuit LT2 takes in a signal of the node n12 when the clock signal CLK is at the L level. Then, if the clock signal CLK changes from the L level to the H level, the latch circuit LT2 outputs a signal obtained by inverting the signal level of the node n12 that was taken immediately before that point as a flag signal COUT2 that indicates whether or not the potential of the relay terminal CIN0 and the potential of the relay terminal CIN1 are substantially the same.

The calibration circuit CAL receives a calibration enable signal CALEN, a sensor enable signal CSREN, a clock signal CLK, and a first trimming signal TC<n:0> (n is an integer of 2 or more).

The calibration enable signal CALEN is a binary signal for switching between a normal mode, in which the determination circuit JC performs a normal operation, and a calibration mode, in which the determination circuit JC performs a calibration operation. The calibration enable signal CALEN is set to the H level when representing the calibration mode, and to the L level when representing the normal mode. The sensor enable signal CSREN is a signal for switching the capacitance sensor circuit 15 between an active state (a state of a normal mode for executing a normal operation) and an inactive state (a state of an inactive mode). For example, the sensor enable signal CSREN is set to the L level when representing the inactive mode, and to the H level when representing the normal mode. The first trimming signal TC<n:0> is a data signal of (n+1) bits to specify a capacitance to be set by the first capacitance circuit CAP10 or the second capacitance circuit CAP20 (that is, a capacitance including an external parasitic capacitance of the IC chip 100 added to the capacitor 50). By specifying the capacitance of the first capacitance circuit CAP10 or the second capacitance circuit CAP20 by the first trimming signal TC<n:0>, the parasitic capacitance generated outside the IC chip 100 can be canceled.

Furthermore, the calibration circuit CAL receives the detection signal COUT output from the determination circuit JC.

The calibration circuit CAL generates a control signal ICAL, a second trimming signal TCO<n:0>, a trimming signal ITC<n:0>, and a clock signal CLKIN according to CALEN, CSREN, CLK, TC<n:0> and COUT.

Below, the operation of the calibration circuit CAL will be described in detail.

Figure 8:
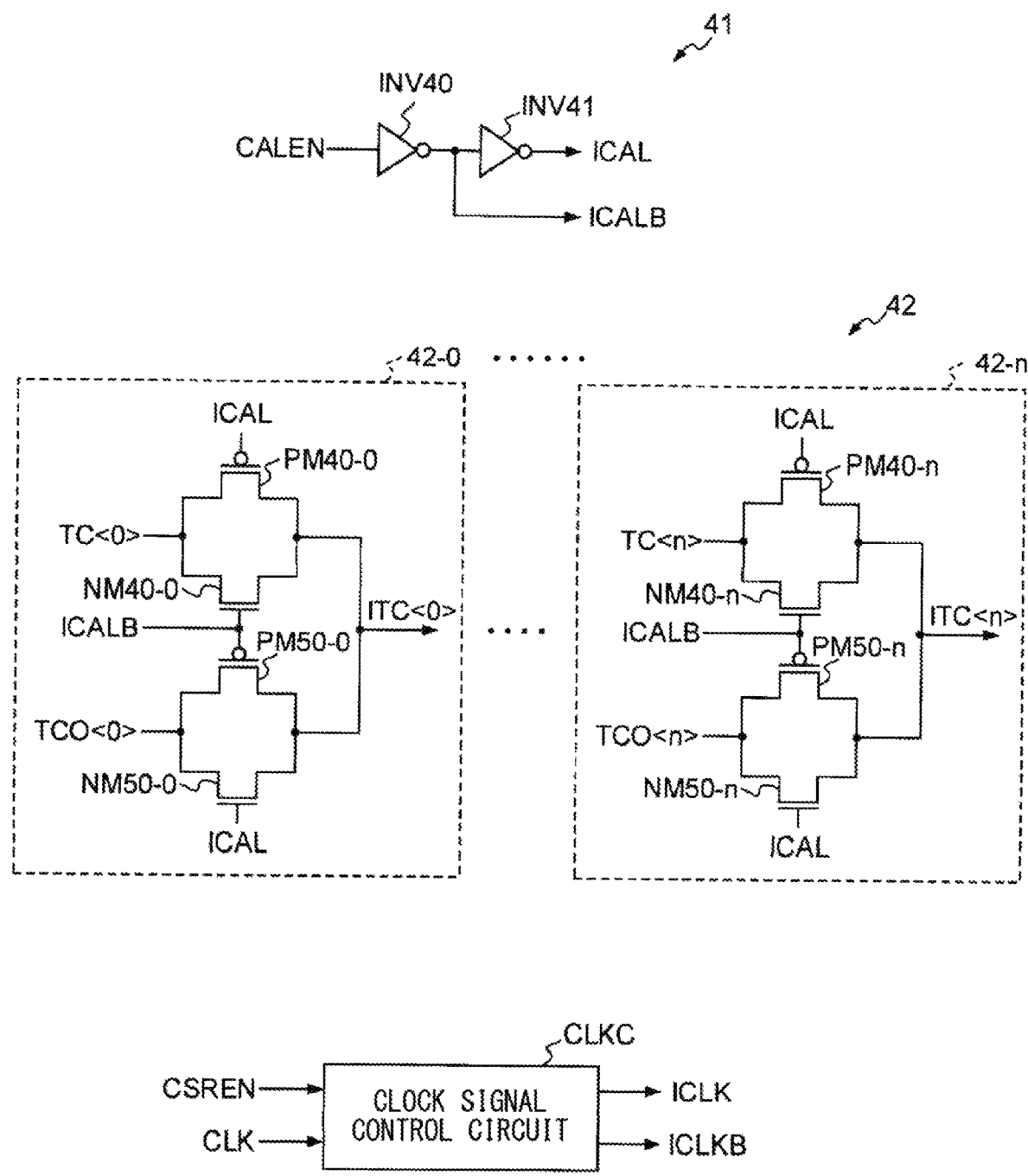
FIG. 8 is a circuit diagram showing a control circuit 41, a trimming signal selection circuit 42, and a clock signal control circuit CLKC included in the calibration circuit CAL.
Figure 9:
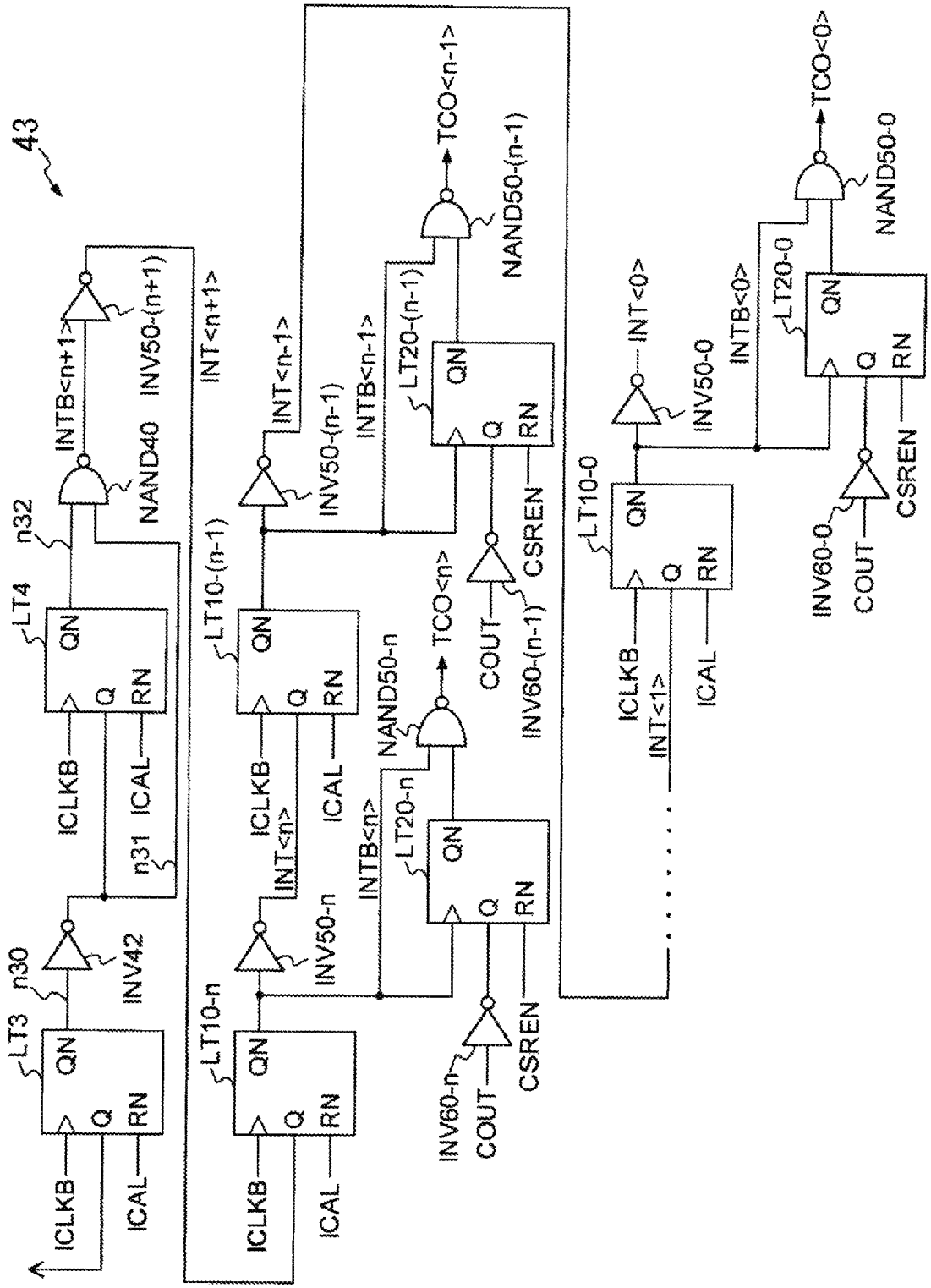
FIG. 9 is a circuit diagram showing a trimming signal generation circuit 43 included in the calibration circuit CAL.

FIGS. 8 and 9 are each a circuit diagram illustrating the configuration of the calibration circuit CAL.

The calibration circuit CAL includes a control circuit 41, a trimming signal selection circuit 42, and a clock signal control circuit CLKC, which are illustrated in FIG. 8, and a trimming signal generation circuit 43, which is illustrated in FIG. 9.

The control circuit 41 is constituted of an inverter INV40 and an inverter INV41.

The output terminal of the inverter INV40 is connected to the input terminal of the inverter INV41. The calibration enable signal CALEN is supplied to the input terminal of the inverter INV40. The inverter INV40 outputs a signal obtained by inverting the signal level of the binary calibration enable signal CALEN as an inverted control signal ICALB. The inverter INV41 outputs a signal obtained by inverting the signal level of the inverted control signal ICALB as a control signal ICAL.

The control circuit 41 supplies the control signal ICAL and the inverted control signal ICALB to the trimming signal selection circuit 42 and the trimming signal generation circuit 43, as well as the first capacitance circuit CAL10 and the second capacitance circuit CAP20 as shown in FIG. 5.

The trimming signal selection circuit 42 is constituted of a (n+1) number of signal selection units 42-0 to 42-n.

The signal selection units 42-0 to 42-n receive first selection signals TC<0> to TC<n>, and second selection signals TCO<0> to TCO<n>.

The first selection signals TC<0> to TC<n> are signals that represent respective digits of the first trimming signal TC<n:0> sent from the controller 14, and each of those signals is a binary signal, or in other words, each of those signals has a prescribed signal level of L or H. The second selection signals TCO<0> to TCO<n> are signals that represent respective digits of the second trimming signal TCO<n:0>, and each of those signals is a binary signal, or in other words, each of those signals has a signal level of L or H. The second selection signal TCO<0> to TCO<n> are generated in the trimming signal generation circuit 43 (will be described below).

The signal selection unit 42-0 includes transistors PM40-0, NM40-0, PM50-0, and NM50-0. The control signal ICAL output from the control circuit 41 is supplied to the gate of the transistor PM40-0. The source of the transistor PM40-0 and the drain of the transistor NM40-0 are connected to each other, and receive the first selection signal TC<0>. The drain of the transistor PM40-0 and the source of the transistor NM40-0 are connected to each other.

The gate of the transistor NM40-0 and the gate of the transistor PM50-0 are connected to each other, and receive the inverted control signal ICALB. The source of the transistor PM50-0 and the drain of the transistor NM50-0 are connected to each other, and receive the second selection signal TCO<0>. The control signal ICAL output from the control circuit 41 is supplied to the gate of the transistor NM50-0. The drain of the transistor PM50-0 and the source of the transistor NM50-0 are connected to each other.

The connection point of the drain of the transistor PM40-0 and the source of the transistor NM40-0 and the connection point of the drain of the transistor PM50-0 and the source of the transistor NM50-0 are connected to each other, and the signal selection unit 42-0 outputs a selection signal ITC<0> from the connection terminal.

The signal selection units 42-1 to 42-n have the same configuration. For example, the signal selection unit 40-n includes transistors PM40-n, NM40-n, PM50-n, and NM50-n. The control signal ICAL output from the control circuit 41 is supplied to the gate of the transistor PM40-n. The source of the transistor PM40-n and the drain of the transistor NM40-n are connected to each other, and receive the first selection signal TC<n>. The drain of the transistor PM40-n and the source of the transistor NM40-n are connected to each other.

The gate of the transistor NM40-n and the gate of the transistor PM50-n are connected to each other, and receive the inverted control signal ICALB. The source of the transistor PM50-n and the drain of the transistor NM50-n are connected to each other, and receive the second selection signal TCO<n>. The control signal ICAL output from the control circuit 41 is supplied to the gate of the transistor NM40-n. The drain of the transistor PM50-n and the source of the transistor NM50-n are connected to each other.

The connection point of the drain of the transistor PM40-n and the source of the transistor NM40-n and the connection point of the drain of the transistor PM50-n and the source of the transistor NM50-n are connected to each other, and the signal selection unit 42-n outputs a selection signal ITC<n> from the connection terminal.

With the configuration described above, the control circuit 41 and the trimming signal selection circuit 42 select one of the first trimming signal TC<n:0> and the second trimming signal TCO<n:0> based on the calibration enable signal CALEN.

That is, if the calibration enable signal CALEN is at the L level, the control circuit 41 and the trimming signal selection circuit 42 select the first trimming signal TC<n:0>. On the other hand, if the calibration enable signal CALEN is at the H level, the control circuit 41 and the trimming signal selection circuit 42 select the second trimming signal TCO<n:0>.

Then, the control circuit 41 and the trimming signal selection circuit 42 supply, as the trimming signal ITC<n:0>, the selected one of TCO<n:0> and TC<n:0> to the first capacitance circuit CAP10 and the second capacitance circuit CAP20 illustrated in FIG. 5.

The clock signal control circuit CLKC receives the clock signal CLK and the sensor enable signal CSREN, each of which is a binary signal (H level or L level), sent from the controller 14.

The clock signal control circuit CLKC generates an output clock signal ICLK, which is a binary signal, and an inverted clock signal ICLKB obtained by inverting the signal level of the output clock signal ICLK in accordance with the clock signal CLK and the sensor enable signal CSREN. That is, if the signal level of the sensor enable signal CSREN is at the L level, the clock signal control circuit CLKC generates an output clock signal ICLK that does not change from the L level. On the other hand, if the signal level of the sensor enable signal CSREN is at the H level, the clock signal control circuit CLKC generates an output clock signal ICLK having the same phase as the clock signal CLK.

The clock signal control circuit CLKC supplies the generated output clock signal ICLK as the clock signal CLKIN to the determination circuit JC, and supplies the inverted clock signal ICLKB to the trimming signal generation circuit 43.

As illustrated in FIG. 9, the trimming signal generation circuit 43 includes latch circuits LT3, LT4, LT10-0 to 10-n, and LT20-0 to 20-n. The trimming signal generation circuit 43 also includes an inverter INV42, inverters INV50-0 to 50-(n+1), and inverters INV60-0 to 60-n. Furthermore, the trimming signal generation circuit 43 includes NAND 40 and NAND 50-0 to 50-n.

A signal input terminal Q of the latch circuit LT3 is connected to the power supply. A clock terminal of the latch circuit LT3 receives the inverted clock signal ICLKB. An input terminal RN of the latch circuit LT3 receives the control signal ICAL. An output terminal QN of the latch circuit LT3 is connected to an input terminal of the inverter INV42 via a node n30. The output terminal of the inverter INV42 is connected to a signal input terminal Q of the latch circuit LT4 via a node n31.

A clock terminal of the latch circuit LT4 receives the inverted clock signal ICLKB. An input terminal RN of the latch circuit LT4 receives the control signal ICAL. An output terminal QN of the latch circuit LT4 is connected to one input terminal of NAND 40 via a node n32.

The other input terminal of NAND40 is connected to the output terminal of the inverter INV42. An output terminal of NAND40 is connected to an input terminal of the inverter INV50-(n+1). NAND 40 supplies the output signal INTB<n+1> to an input terminal of the inverter INV50-(n+1). The inverter INV50-(n+1) supplies an output signal INT<n+1> obtained by inverting the output signal INTB<n+1> from NAND40 to the latch circuit LT10-n.

A clock terminal of the latch circuit LT10-n receives the inverted clock signal ICLKB. An input terminal RN of the latch circuit LT10-n receives the control signal ICAL. A signal input terminal Q of the latch circuit LT10-n is connected to the output terminal of the inverter INV50-(n+1). The latch circuit LT10-n outputs an output signal INTB<n> from an output terminal QN. The output terminal QN of the latch circuit LT10-n is connected to an input terminal of the inverter INV50-n, and is also connected to a clock terminal of the latch circuit LT20-n and one input terminal of NAND 50-n.

The inverter INV50-$n$ supplies an output signal INT<$n$> obtained by inverting the output signal INTB<$n$> from the output terminal QN of the latch circuit LT10-$n$. The output terminal of the inverter INV50-$n$ is connected to a signal input terminal Q of the latch circuit LT10-($n$−1).

A clock terminal of the latch circuit LT10-($n$−1) receives the inverted clock signal ICLKB. An input terminal RN of the latch circuit LT10-($n$−1) receives the control signal ICAL. The signal input terminal Q of the latch circuit LT10-($n$−1) is connected to the output terminal of the inverter INV50-$n$. The latch circuit LT10-($n$−1) outputs an output signal INTB<$n$−1> from the output terminal QN. The output terminal QN of the latch circuit LT10-($n$−1) is connected to the input terminal of the inverter INV50-($n$−1), and is also connected to the clock terminal of the latch circuit LT20-($n$−1) and one input terminal of NAND 50-($n$−1).

The inverter INV50-($n$−1) outputs an output signal INT<$n$−1> obtained by inverting the output signal INTB<$n$−1> from the output terminal QN of the latch circuit LT10-($n$−1).

Similarly, in a latch circuit LT10-$k$ ($k$=($n$−2) to 1), a clock terminal receives the inverted clock signal ICLKB. An input terminal RN of the latch circuit LT10-$k$ receives the control signal ICAL. A signal input terminal Q of the latch circuit LT10-$k$ is connected to an output terminal of the inverter INV50-($k$+1). The output terminal QN of the latch circuit LT10-$k$ is connected to the input terminal of the inverter INV50-$k$, and is also connected to a clock terminal of the latch circuit LT20-$k$ and one input terminal of NAND50-$k$.

A clock terminal of the latch circuit LT10-0 receives the inverted clock signal ICLKB. An input terminal RN of the latch circuit LT10-0 receives the control signal ICAL. A signal input terminal Q of the latch circuit LT10-0 receives an output signal INT<1> of the inverter INV50-$n$. The latch circuit LT10-0 outputs an output signal INTB<0> from the output terminal QN. The output terminal QN of the latch circuit LT10-0 is connected to the input terminal of the inverter INV50-0, and is also connected to a clock terminal of the latch circuit LT20-0 and one input terminal of NAND50-0.

Each input terminal of the inverters INV60-0 to 60-$n$ receives the detection signal COUT output from the determination circuit JC. The inverters INV60-0 to 60-$n$ output a signal obtained by inverting the level of the detection signal COUT from the output terminal, and supply that signal to signal input terminals Q of the latch circuits LT20-0 to 20-$n$, respectively.

A clock terminal of the latch circuit LT20-$n$ receives an output signal from the output terminal QN of the latch circuit LT10-$n$. An input terminal RN of the latch circuit LT20-$n$ is connected to an enable terminal of the calibration circuit CAL, and receives the sensor enable signal CSREN. A signal input terminal Q of the latch circuit LT20-$n$ is connected to an output terminal of the inverter INV60-$n$. An output terminal QN of the latch circuit LT20-$n$ is connected to the other input terminal of NAND50-$n$.

A clock terminal of the latch circuit LT20-($n$−1) receives an output signal from the output terminal QN of the latch circuit LT10-($n$−1). An input terminal RN of the latch circuit LT20-($n$−1) receives the sensor enable signal CSREN. A signal input terminal Q of the latch circuit LT20-($n$−1) is connected to an output terminal of the inverter INV60-($n$−1). An output terminal QN of the latch circuit LT20-($n$−1) is connected to the other input terminal of NAND50-($n$−1).

Similarly, in a latch circuit TL20-$k$ ($k$ is an integer of ($n$−2) to 0), a clock terminal receives an output signal from the output terminal QN of a latch circuit LT10-$k$. An input terminal RN of the latch circuit LT20-$k$ receives the sensor enable signal CSREN. A signal input terminal Q of the latch circuit LT20-$k$ is connected to an output terminal of an inverter INV60-$k$. An output terminal QN of the latch circuit LT20-$k$ is connected to the other input terminal of NAND50-$k$.

In the latch circuits LT3, LT4, LT10-0 to 10-$n$, and LT20-0 to 20-$n$, when the signal level of the signal input to the input terminal RN is at the L level, the output signal from the output terminal QN does not change from the H level. On the other hand, when the signal level of the signal input to the input terminal RN is at the H level, each latch circuit outputs, from the output terminal QN, a signal obtained by inverting the signal that was input into the signal input terminal Q at a rise of the clock terminal.

NANDs 50-0 to 50-$n$ generate the resultant signals of NAND of the output signals from the latch circuits LT10-0 to 10-$n$ and the output signals from the latch circuits LT20-0 to 20-$n$ as the second selection signals TCO<0> to TCO<$n$>. This causes the second trimming signal TCO<$n$:0> to be generated in the calibration circuit CAL, and this signal is supplied to the trimming signal selection circuit 42 and the controller 14.

The second trimming signal TCO<$n$:0> is temporarily stored in the memory 16 by the controller 14. Thereafter, every time the power is turned on, the controller 14 reads out the second trimming signal TCO<$n$:0> from the memory 16, and supplies this signal to the calibration circuit CAL as the first trimming signal TC<$n$:0>.

Next, the configurations of the first capacitance circuit CAP10, the second capacitance circuit CAP20, and the third capacitance circuit CAP30 shown in FIG. 5 will be described.

Each of the capacitance circuits CAP10, CAP20, and CAP30 is a circuit that includes a plurality of capacitors, and is capable of selectively switching the value of the capacitance of the entire circuit.

The capacitance circuit CAP10 is set to a non-test mode when receiving the L-level test signal ITEST2 from the switching circuit SW, and is set to a test mode when receiving the H-level test signal ITEST2. The capacitance circuit CAP20 is set to the non-test mode when receiving the L-level inverted test signal ITESTB2 from the switching circuit SW, and is set to the test mode when receiving the H-level inverted test signal ITESTB2. The capacitance circuit CAP30 is set to the non-test mode when receiving the L-level signal CIN0TP from the switching circuit SW, and is set to the test mode when receiving the H-level signal CIN0TP.

Furthermore, each of the capacitance circuits CAP10, CAP20 and CAP30 receives from the controller 14 a margin trimming signal TM<$m$:0> of m-bit (m is an integer of 2 or greater), and the switching signal OPT2 described above.

The capacitance circuit CAP30 also receives from the controller 14 an enable signal EN and a capacitance value selection signal TP<$k$:0> used in the test mode.

The capacitance circuit CAP30 enables the margin trimming signal TM<$m$:0> when the signal level of the enable signal EN is H. The capacitance circuit CAP30 disables the margin trimming signal TM<$m$:0> when the signal level of the enable signal EN is L.

The capacitance value selection signal TP<$k$:0> is a data signal of ($k$+1)-bits for selecting the capacitance value of the capacitance circuit CAP30 in the test mode, taking into account the parasitic capacitance outside the IC chip 100 added to the sensor capacitor 50.

Figure 10:
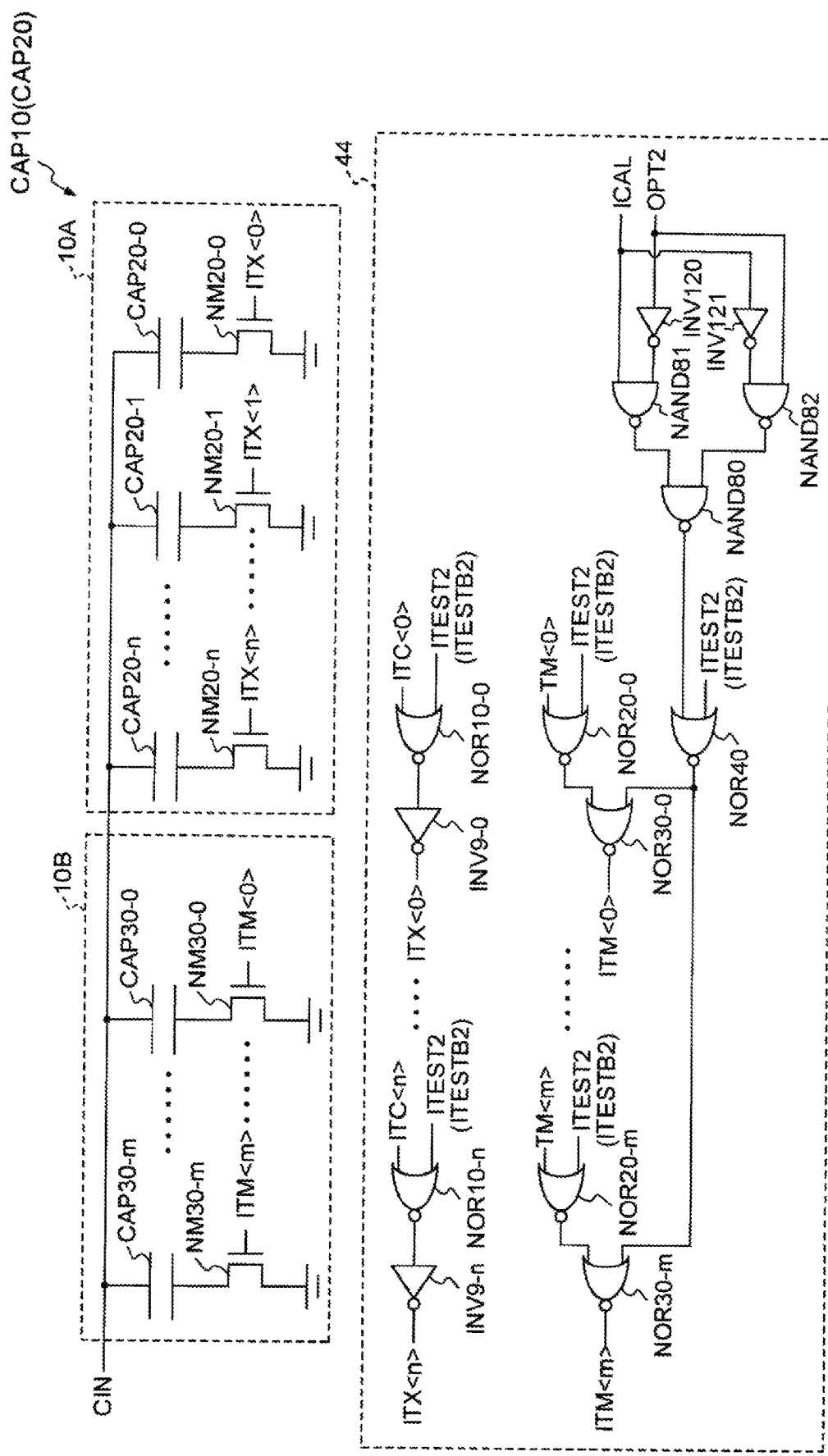
FIG. 10 is a circuit diagram showing an internal configuration of a capacitance circuit CAP10 (CAP20).

FIG. 10 is a circuit diagram showing the configuration of the capacitance circuit CAP10 and CAP 20.

The configurations of the capacitance circuits CAP10 and CAP20 are the same as each other except that CAP10 receives the test signal ITEST2 and CAP20 receives the inverted test signal ITESTB2.

Thus, the circuit configuration of the capacitance circuit CAP10 only will be explained below as an example.

As illustrated in FIG. 10, the capacitance circuit CAP10 (CAP20) includes a first circuit unit 10A, a second circuit unit 10B, and a signal generation circuit 44.

The first circuit unit 10A includes capacitors CAP20-0, CAP20-1, . . . CAP20-n and transistors NM20-0, NM20-1, . . . NM20-n that are N-channel MOSFETs. In each of the capacitors CAP20-0 to CAP20-n, one end is connected to the capacitance connecting terminal CIN via a common line, and the other end is connected to the drain of a corresponding one of the transistors NM20-1 to NM20-n. In the transistors NM20-0 to NM20-n, the respective sources are grounded, and the gates receive selection signals ITX<0> to ITX<n>, respectively.

The second circuit unit 10B includes capacitors CAP30-0 to 30-m, which are a (m+1) number of capacitors, and transistors NM30-0 to 30-m, which are a (m+1) number of N-channel MOSFETs. One end of each of the capacitors CAP30-0 to 30-m is connected to the capacitance connection terminal CIN via a common line. The other end of the capacitor CAP30-0 is connected to the drain of the transistor NM30-0. Similarly, the other end of each of the capacitors CAP30-1 to 30-m is connected to the drain of a corresponding one of the transistors NM30-1 to 30-m. The respective sources of the transistors NM30-0 to 30-m are grounded. The respective gates of the transistors NM30-0 to 30-m receive the selection signals ITM<0> to ITM<m>, respectively.

The signal generation circuit 44 includes a (n+1) number of inverters INV9-0 to 9-n, and a (n+1) number of NOR gate circuits NOR10-0 to 10-n.

The signal generation circuit 44 also includes two inverters INV120 and INV121, three NAND gate circuits NAND80 to 82, a (m+1) number of NOR gate circuits NOR20-0 to 20-m, a (m+1) number of NOR gate circuits of NOR30-0 to 30-m, and one NOR gate circuit NOR40.

Respective output terminals of the NOR10-0 to 10-n are connected to respective input terminals of INV9-0 to 9-n. One input terminal of each of NOR10-0 to 10-n receives a corresponding one of the selection signals ITC<0> to ITC<n> output from the calibration circuit CAL. The other input terminal of each of NOR10-0 to 10-n receives the test signal ITEST2 (ITESTB2 in CAP20).

INV9-0 to 9-n supply the selection signal ITX<0> to ITX<n>, which are obtained by inverting the level of the output signals of NOR10-0 to 10-n, to the respective gates of the transistors NM20-0 to NM20-n.

An output terminals of each of the NOR20-0 to 20-m is connected to one input terminal of corresponding one of NOR30-0 to 30-m. One input terminal of each of NOR20-0 to 20-m receives the margin trimming signal TM<m:0> sent from the controller 14. The other input terminal of each of NOR20-0 to 20-m receives the test signal ITEST2 (ITESTB2 in CAP20).

The other input terminal of each of NOR30-0 to 30-m is connected to the output terminal of NOR40.

One input terminal of NOR40 is connected to the output terminal of NAND80, and the other input terminal receives the test signal ITEST2 (ITESTB2 in CAP20). One input terminal of NAND81 is supplied with the control signal ICAL output from the calibration circuit CAL, and the other input terminal is connected to the output terminal of INV120. The input terminal of INV120 is supplied with the switching signal OPT2 sent from the controller 14. One input terminal of NAND82 is supplied with the control signal OPT2, and the other input terminal is connected to the output terminal of INV121. The input terminal of INV121 is supplied with the switching signal ICAL.

NOR30-0 to 30-m output the selection signal ITM<0> to ITM<m>, respectively, and supply the respective signals to the respective gates of the transistors NM30-0 to NM30-m.

With this configuration, the CAP10 (CAP20) acts as a variable capacitor that changes the capacitance by the selection signals ITC<0> to ITC<n> and the margin trimming signal TM<m:0> during a period in which the L-level test signal ITEST2 (ITESTB2) is being supplied. That is, during such a period, the CAP10 (CAP20) becomes a capacitor in which the capacitance thereof is set by the selection signals ITC<0> to ITC<n> and the margin trimming signal TM<m:0>.

On the other hand, while receiving the H-level test signal ITEST2 (ITESTB2), the CAP10 (CAP20) is equivalent to a capacitor having a capacitance that equals the sum of the capacitances of the capacitors CAP20-0 to 20-m and CAP30-0 to 30-m.

The CAP10 is a capacitor that provides a first reference capacitance for determining whether or not the capacitance of the sensor capacitor 50 is lower than a prescribed value when the sensor capacitor 50 is connected to the electrode pads P0 and P2. The CAP20 is a capacitor that provides a second reference capacitance for determining whether or not the capacitance of the sensor capacitor 50 is lower than a prescribed value when the sensor capacitor 50 is connected to the electrode pads P3 and P2.

The capacitance circuit CAP30 is used for testing whether or not the detection operation and calibration (described later) by the capacitance sensor circuit 15 are normally performed in a state where the sensor capacitor 50 is not externally connected to the IC chip 100, that is, the IC chip 100 by itself. That is, the capacitance circuit CAP30 acts as the sensor capacitor 50 in such a test.

Figure 11:
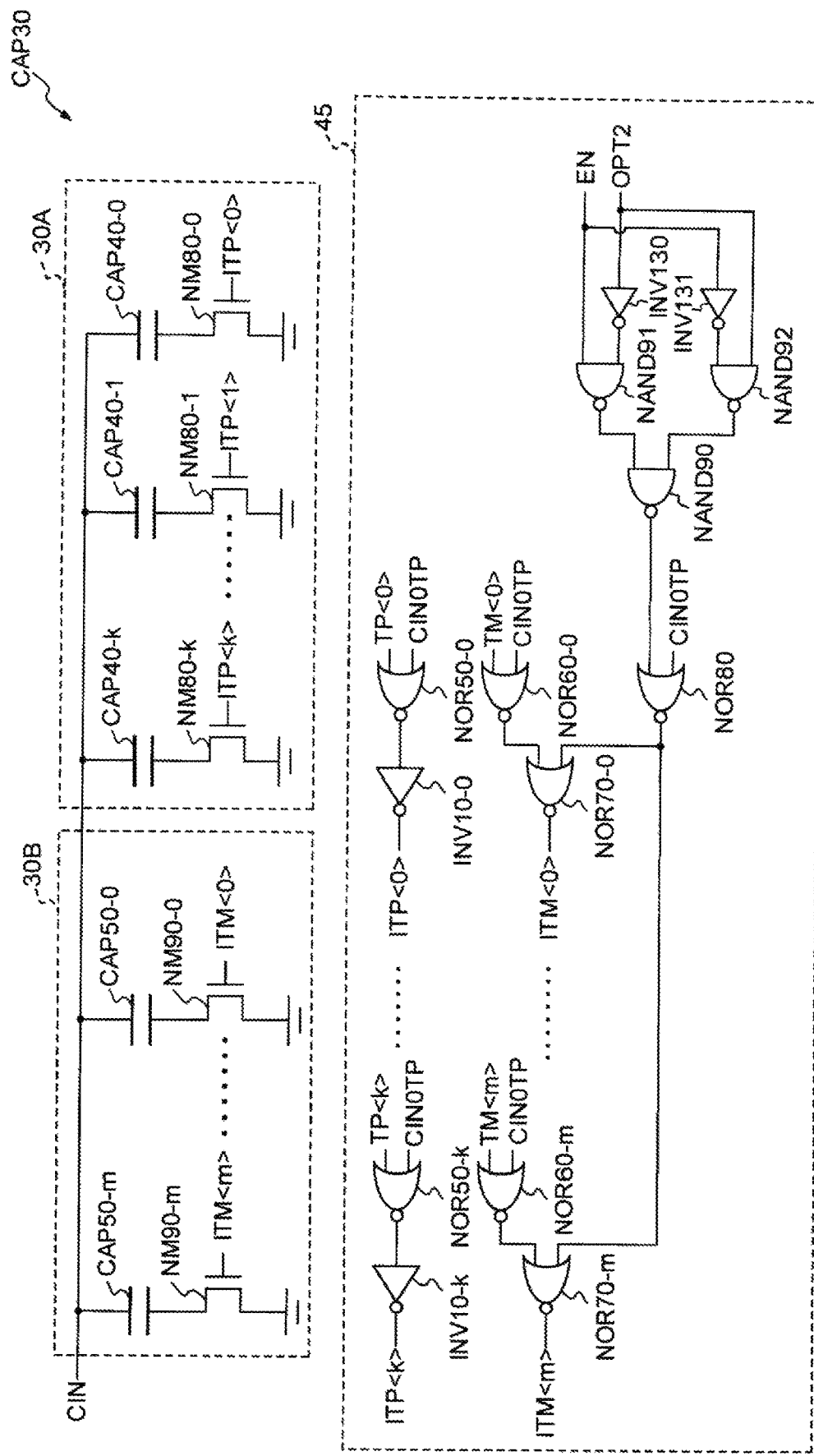
FIG. 11 is a circuit diagram showing an internal configuration of a capacitance circuit CAP30.

FIG. 11 is a circuit diagram illustrating the configuration of the capacitance circuit CAP30.

As illustrated in FIG. 11, the capacitance circuit CAP30 includes a first circuit unit 30A, a second circuit unit 30B, and a signal generation circuit 45.

The first circuit unit 30A includes capacitors CAP40-0, CAP40-1, . . . CAP40-k and transistors NM80-0, NM80-1, . . . NM80-k that are N-channel MOSFETs. In each of the capacitors CAP40-0 to CAP40-k, one end is connected to the capacitance connecting terminal CIN via a common line, and the other end is connected to the drain of a corresponding one of the transistors NM80-1 to NM80-k. In the transistors NM80-0 to NM80-n, the respective sources are grounded, and the gates receive selection signals ITP<0> to ITP<k>, respectively.

The second circuit unit 30B includes capacitors CAP50-0 to 50-m, which are a (m+1) number of capacitors, and transistors NM90-0 to 90-m, which are a (m+1) number of N-channel MOSFETs. One end of each of the capacitors CAP50-0 to 50-m is connected to the capacitance connection terminal CIN via a common line. The other end of the capacitor CAP50-0 is connected to the drain of the transistor NM90-0. Similarly, the other end of each of the capacitors CAP50-1 to 50-m is connected to the drain of corresponding one of the transistors NM90-1 to 90-m. The respective sources of the transistors NM90-0 to 90-m are grounded.

The respective gates of the transistors NM90-0 to 90-*m* are supplied with the selection signals ITM<0> to ITM<m>.

The signal generation circuit 45 includes a (k+1) number of inverters INV10-0 to 10-*k*, and a (k+1) number of NOR gate circuits NOR50-0 to 50-*k*.

The signal generation circuit 45 also includes two inverters INV130 and INV131, three NAND gate circuits NAND90 to 92, a (m+1) number of NOR gate circuits NOR60-0 to 60-*m*, a (m+1) number of NOR gate circuits of NOR70-0 to 70-*m*, and one NOR gate circuit NOR80.

Respective output terminals of the NOR50-0 to 50-*k* are connected to respective input terminals of INV10-0 to 10-*k*. One input terminal of each of NOR50-5 to 50-*k* receives corresponding one of the selection signals TP<0> to TP<k> sent from the controller 14. The other input terminal of each of NOR50-0 to 50-*k* receives a signal CIN0TP output from the calibration circuit CAL.

INV10-0 to 10-*k* supply the selection signals ITP<0> to ITP<k>, which are obtained by inverting the level of the output signals of NOR50-0 to 50-*k*, to the respective gates of the transistors NM80-0 to NM80-*k*.

Each output terminal of NOR60-0 to 60-*m* is connected to one input terminal of a corresponding one of NOR70-0 to 70-*m*. One input terminal of each of NOR60-0 to 60-*m* receives the margin trimming signal TM<m:0> sent from the controller 14. The other input terminal of each of NOR60-0 to 60-*m* receives the signal CIN0TP described above.

The other input terminal of each of NOR70-0 to 70-*m* is connected to the output terminal of NOR80.

One input terminal of NOR80 is connected to the output terminal of NAND90, and the other input terminal receives the signal CIN0TP. One input terminal of NAND91 is supplied with the enable signal EN output from the controller 14, and the other input terminal is connected to the output terminal of INV130. The input terminal of INV130 is supplied with the switching signal OPT2 sent from the controller 14. One input terminal of NAND92 is supplied with the switching OPT2, and the other input terminal is connected to the output terminal of INV131. The input terminal of INV131 is supplied with the enable signal EN.

NOR70-0 to 70-*m* output the selection signals ITM<0> to ITM<m>, respectively, and supply the respective signals to the respective gates of the transistors NM90-0 to NM90-*m*.

Below, the operation of the capacitance sensor circuit 15 will be explained in detail.

First, if a capacitor with a relatively small capacitance is used for the sensor capacitor 50, one electrode W1 of the sensor capacitor 50 is connected to the electrode pad P0 of the IC chip 100, and the other electrode W2 of the sensor capacitor 50 is connected to the electrode pad P2. On the other hand, if a capacitor with a relatively large capacitance is used for the sensor capacitor 50, one electrode W1 of the sensor capacitor 50 is connected to the electrode pad P3 of the IC chip 100, and the other electrode W2 of the sensor capacitor 50 is connected to the electrode pad P2.

Next, the calibration process is performed so that the capacitance of the capacitance circuits CAP10, CAP20, and CAP3, which are variable capacitors, is automatically corrected to a capacitance corresponding to the capacitance of the sensor capacitor 50 that is externally connected to the IC chip 100.

As described above, when the sensor capacitor 50 is connected to the electrode pads P0 and P2, only CAP10, of the capacitance circuits CAP10 and CAP20, is used, and when the sensor capacitor 50 is connected to the electrode pads P3 and P2, only CAP20 is used. The same calibration operation is performed on CAP10 and CAP20, and thus, the description below explains the calibration operation performed on CAP10 when the sensor capacitor 50 is connected to the electrode pads P0 and P2 as an example.

Figure 12:
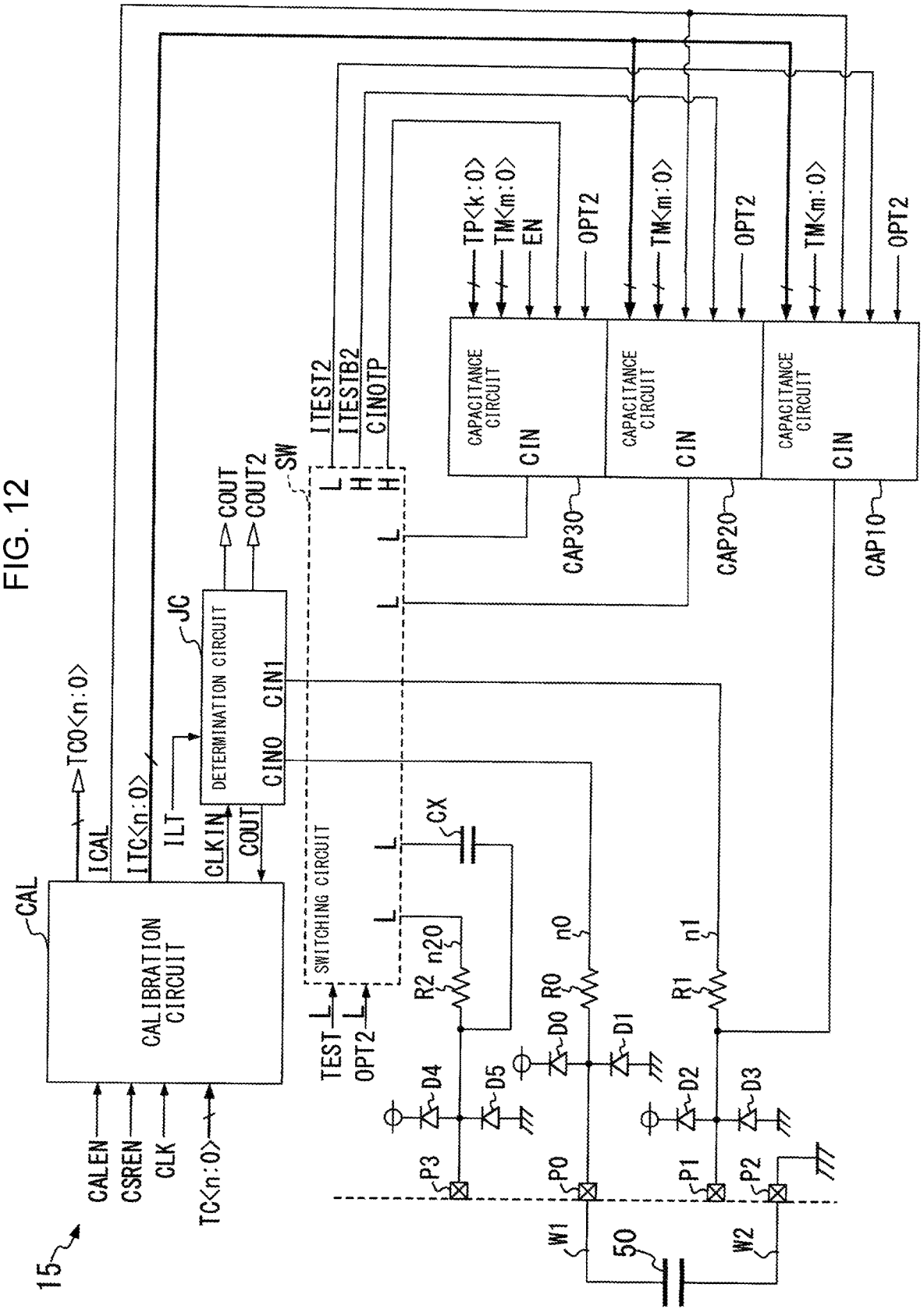
FIG. 12 is a block diagram illustrating the state of the capacitance sensor circuit 15 when the sensor capacitor 50 is connected to electrode pads P0 and P2.

FIG. 12 is a block diagram illustrating the state of the capacitance sensor circuit 15 when the sensor capacitor 50 is connected to the electrode pads P0 and P2.

To perform the calibration process, the controller 14 first supplies the L-level test mode signal TEST to the switching circuit SW, and supplies the L-level leak test signal ILT to the determination circuit JC. Furthermore, the controller 14 supplies the L-level switching signal OPT2 that selects CAP10 from the capacitance circuits CAP10 and CAP20 to the switching circuit SW and the capacitance circuits CAP10, CAP20, and CAP30, respectively.

As a result, as illustrated in FIG. 12, the switching circuit SW connects the electrode W1 of the sensor capacitor 50 to the relay terminal CIN0 of the determination circuit JC via the node n0, the resistor R0, and the electrode pad P0. The switching circuit SW also connects the capacitance connection terminal CIN of the capacitance circuit CAP10 to the relay terminal CIN1 of the determination circuit JC via the node n1 and the resistor R1.

Furthermore, as illustrated in FIG. 12, the switching circuit SW applies an L-level signal to the node n20, the other end of the auxiliary capacitor CX, and the capacitance connection terminals CIN of the capacitance circuits CAP20 and CAP30. This way, the capacitance connection terminals CIN of the capacitance circuits CAP30 and CAP20 are not connected to the determination circuit JC, and thus do not get involved in the operation of the capacitance sensor circuit 15.

Figure 13:
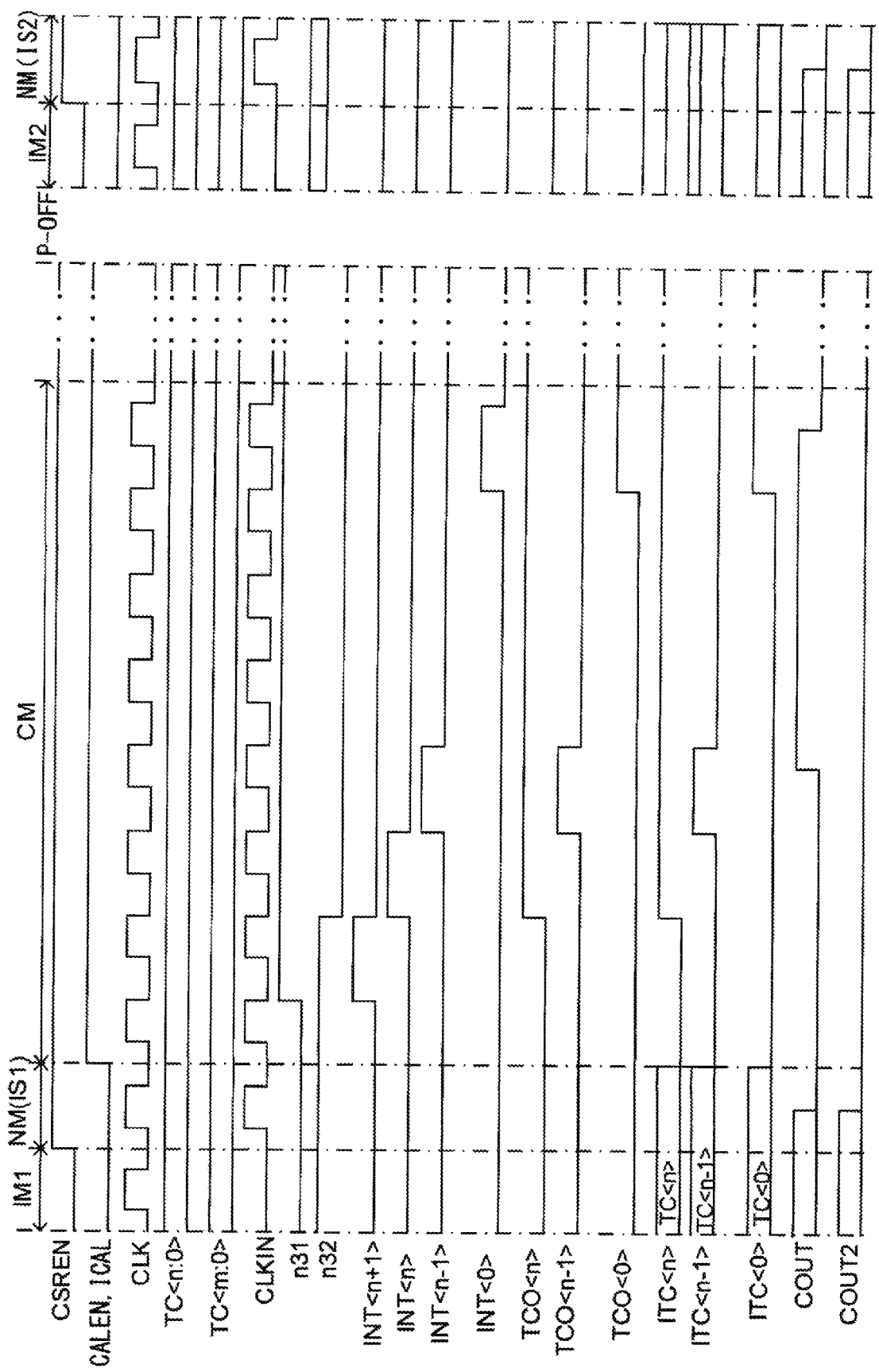
FIG. 13 is a time chart illustrating a calibration operation.

FIG. 13 is a time chart showing the calibration operation performed by the calibration circuit CAL, which is controlled by the controller 14.

[Inactive Mode IM1]

First, the controller 14 supplies the sensor enable signal CSREN and the calibration enable signal CALEN of L level to the calibration circuit CAL. This sets all of the input terminals RN of the latch circuits LT20-0 to 20-*n* of FIG. 9 to the L level. At this time, the output clock signal ICLK is at the L level, the inverted clock signal ICLKB is at the H level, the control signal ICAL is at the L level, and the inverted control signal ICALB is at the L level.

The transistors PM40-0 to 40-*n* of the trimming signal selection circuit 42 of FIG. 8 are turned on by receiving the L-level control signal ICAL at the respective gates thereof. The transistors NM40-0 to 40-*n* are turned on by receiving the H-level inverted control signal ICALB at the respective gates thereof.

The transistors PM50-0 to 50-*n* are turned off by receiving the H-level inverted control signal ICALB at the respective gates thereof. The transistors NM50-0 to 50-*n* are turned on by receiving the L-level control signal ICAL at the respective gates thereof. This causes the trimming signal selection circuit 42 to output the first selection signal TC<0> to TC<n> as the selection signal ITC<0> to ITC<n>. That is, the first trimming signal TC<n:0> is output as the trimming signal ITC<n:0>.

The latch circuit LT3, the latch circuit LT4, the latch circuits LT10-0 to 10-*n*, and the latch circuits LT20-0 to 20-*n* of the trimming signal generation circuit 43 of FIG. 9 output an H-level signal from the respective output terminals QN. This sets INT<n+1:0> (that is, INT<n+1>, INT<n>, . . . INT<0>) and TCO<n:0> (that is, TCO<n>, TCO<n−1>, . . . TCO<0>) to the L level.

Because the output clock signal ICLK is at the L level, the clock signal CLKIN becomes an L-level signal, and because the clock signal CLKIN is an L-level signal, the detection signal COUT and the flag signal COUT2 stay at the H level, which is the data value immediately preceding to this point. In FIG. 13, this period is labeled as the inactive mode IM1.

[Normal Mode NM (Initial State IS1)]

Thereafter, the controller 14 changes the sensor enable signal CSREN from the L level to the H level. This causes the clock signal control circuit CLKC to output an output clock signal ICLK having the same phase as the clock signal CLK, and output an inverted signal of the clock signal CLK as an inverted clock signal ICLKB. At this time, the signals output from the output terminals QN of the latch circuits LT3, LT4, LT10-0 to 10-$n$ and LT20-0 to 20-$n$ illustrated in FIG. 9 remain at the H level, and thus, respective signals INT<n+1:0> and TCO<n:0> all remain at the L level.

Because the output clock signal ICLK is a signal of the same phase as the clock signal CLK, the clock signal CLKIN is also a signal having the same phase as the clock signal CLK. This clock signal CLKIN activates the capacitance sensor circuit 15, which then outputs the detection signal COUT and the flag signal COUT2. For example, if the dielectric between the electrodes of the sensor capacitor 50 is in a solid state before melting and the capacitance value of the capacitance circuit CAP10 is smaller than that of the sensor capacitor 50, the signal levels of the detection signal COUT and the flag signal COUT2 are both L level. In FIG. 13, this period is labeled as the normal mode NM1 (Initial State IS1).

[Calibration Mode CM]

Thereafter, the controller 14 changes the calibration enable signal CALEN from the L level to the H level. This sets the control signal ICAL to the H level and the inverted control signal ICALB to the L level. The transistors PM40-0 to 40-$n$ of the trimming signal selection circuit 42 are turned off by receiving the H level control signal ICAL at the gates thereof, and the transistors NM40-0 to 40-$n$ are turned off by receiving the L level inverted control signal ICALB at the gates thereof. On the other hand, the transistors PM50-0 to 50-$n$ are turned on by receiving the L level inverted control signal ICALB at the gates thereof, and the transistors NM50-0 to 50-$n$ are turned on by receiving the H level control signal ICAL at the gates thereof.

This causes the trimming signal selection circuit 42 to output the second selection signal TCO<0> to TCO<n> as the selection signal ITC<0> to ITC<n>. That is, the second trimming signal TCO<n:0> is output as the trimming signal ITC<n:0>. Because the respective signals INT<n+1:0> and TCO<n:0> are at the L level, the respective trimming signals ITC<n:0> are also at the L level.

When the clock signal CLK is input to the calibration circuit CAL in this state, the potential of the node n31 of the trimming signal generation circuit 43 of FIG. 9 rises at the first fall of the clock signal CLK, and at the second fall of the clock signal CLK, the node n32 falls. Therefore, the output signal INT<n+1> of the inverter INV50-($n$+1) of the trimming signal generation circuit 43 rises to the H level, only between the first clock and the second clock of the clock signal CLK during the calibration mode NM.

Here, the circuits constituted of the latch circuits LT10-$n$ to 10-0 and the inverters INV50-$n$ to 50-0 of FIG. 9 are each a shift register that shifts and outputs each bit of INT<n:0>. Thus, the H pulse of the output signal INT<n+1> shifts from the output signals INT<n> to INT<0> in this order after the third fall of the clock signal CLK. When the output signal INT<n> is at the H level, the output signal INTB<n> is at the L level, and thus, the second selection signal TCO<n> is at the H level. At this time, INT<n-1:0> are all at the L level.

As described above, since the second trimming signal TCO<n:0> is output as the trimming signal ITC<n:0>, only the capacitor CAP20-$n$, among the capacitors CAP20-$n$ to 20-0 of the capacitance circuit CAP10 of FIG. 10, functions as a capacitance, and the other capacitors do not function. On the other hand, in the capacitors CAP30-$m$ to 30-0, the control signal ICAL rises to the H level when the calibration enable signal CALEN rises to the H level. Therefore, ITM<m:0> (that is, the selection signals ITM<0> to ITM<m>) are the same signal as the margin trimming signal TM<m:0>, and the capacitors CAP30-$m$ to 30-0 function as capacitors having a capacitance corresponding to the input of the margin trimming signal TM<m:0>.

If the clock signal CLK rises in this state, the detection signal COUT output from the determination circuit JC is supplied to the calibration circuit CAL. Therefore, at the next fall of the clock signal CLK, INTB<n> rises and INT<n> falls, which causes an inverted signal of the detection signal COUT to be stored in the latch circuit 20-$n$ of the trimming signal generation circuit 43 of FIG. 9. This continues to be the output data of the second selection signal TCO<n> while the calibration enable signal CALEN is at the H level.

Here, the capacitance sensor circuit 15 of this embodiment is designed to output the L-level detection signal COUT if the dielectric between the electrodes of the sensor capacitor 50 is in the solid state before melting, and to output the H-level detection signal COUT if the dielectric has already melted.

That is, when the determination circuit JC of the capacitance sensor circuit 15 determines that the capacitance (reference capacitance) of the capacitance circuit CAP10 is smaller than the capacitance of the sensor capacitor 50, the detection signal COUT is set to the L level, and as a result, the H-level second selection signal TCO<n> is output. On the other hand, when the determination circuit JC determines that the capacitance of the capacitance circuit CAP10 is greater than the capacitance of the sensor capacitor 50, the detection signal COUT is set to the H level, and as a result, the L-level second selection signal TCO<n> is output.

At the next clock, TCO<n-1> rises to the H level, while INT<n-2:0> all remain at the L level. Therefore, the capacitor CAP20-$n$ of the capacitance circuit CAP10 functions as a capacitance when TCO<n> is at the H level, that is, when the capacitance circuit CAP10 has a smaller capacitance than that of the sensor capacitor 50. On the other hand, when TCO<n> is at the L level, that is, when the capacitance circuit CAP10 has a larger capacitance than that of the sensor capacitor 50, the capacitor CAP20-$n$ of the capacitance circuit CAP10 does not function as a capacitance.

Also, only CAP20-($n$-1), among the capacitors CAP20-($n$-1) to 20-0, functions as a capacitance, and the other capacitors do not function as a capacitance. If the clock signal CLK rises in this state, the detection signal COUT output from the determination circuit JC is supplied to the calibration circuit CAL. At the next fall of the clock signal CLK, INTB<n-1> rises, and INT<n-1> falls. This causes an inverted signal of the detection signal COUT to be stored in the latch circuit 20-($n$-1) of the trimming signal generation circuit 43 of FIG. 9, which continues to be the second selection signal TCO<n-1> while the calibration enable signal CALEN is at the H level.

Thereafter, the same process is repeated until an inverted signal obtained by inverting the signal level of the detection signal COUT is stored in the latch circuit LT20-0, and is maintained as the TCO<0> signal while the calibration enable signal CALEN is at the H level.

As described above, a series of operations are performed while the calibration enable signal CALEN stays at the H level, so that when the capacitance of the sensor capacitor 50 is larger than the capacitance of the capacitance circuit CAP10, the capacitance of the capacitance circuit CAP10 is reduced, and when the capacitance of the sensor capacitor 50 is smaller than the capacitance of the capacitance circuit CAP10, the capacitance of the capacitance circuit CAP10 increases. That is, the second trimming signal TCO<n:0> is set such that the capacitance of the capacitance circuit CAP10 equals the capacitance of the sensor capacitor 50 in the solid state. In FIG. 13, this period is labeled as the calibration mode CM. During the calibration mode, the controller 14 supplies, to the capacitance circuit CAP10, a margin trimming signal TM<m:0> that sets the margin to a half of the difference between the capacitance of the sensor capacitor 50 before the dielectric melts and the capacitance of the sensor capacitor 50 after the dielectric has melted, for example. After the calibration is completed, the controller 14 stores the second trimming signal TCO<n:0> immediately after the calibration in a non-volatile memory 16.

[Inactive Mode IM2]

Thereafter, when the power supply is shut off (P-OFF period of FIG. 13) and then the power is turned back on, the controller 14 reads out the second trimming signal TCO<n:0> from the memory 16, and supplies this signal as the first trimming signal TC<n:0> to the calibration circuit CAL. In FIG. 13, this period is labeled as the inactive mode IM2.

[Normal Mode NM (Initial State IS2)]

The controller 14 then changes the sensor enable signal CSREN from the L level to the H level, and supplies the L-level calibration enable signal CALEN to the calibration circuit CAL, thereby activating the capacitance sensor circuit 15. At this time, since the calibration enable signal CALEN and the switching signal OPT2 are both at the L level, ITM<m:0> of the (m+1)-bit of the signal generation circuit 44 shown in FIG. 10 (that is, the selection signals ITM<0> to ITM<m>) are all at the L level. Thus, none of the capacitors CAP30-0 to 30-$m$ functions as a capacitance.

As a result, the capacitance of the capacitance circuit CAP10, that is, the reference capacitance is set to a capacitance value between the first capacitance before the dielectric of the sensor capacitor 50 melts, including the parasitic capacitance outside the IC chip 100, and the second capacitance after the dielectric has melted. In FIG. 13, this period is labeled as the normal mode NM (Initial State IS2).

In short, in the series of calibration processes described above, the controller 14 supplies, to the second circuit unit 10B, the margin trimming signal TM (referred to as the first trimming signal) that sets the capacitance of the second circuit unit 10B of the capacitance circuit CAP10 to the margin capacitance. The calibration circuit CAL performs calibration to supply, to the first circuit unit 10A, the second trimming signal TCO (ITC) that sets the capacitance of the first circuit unit 10A of the capacitance circuit CAP10 to a capacitance that gradually changes as time progresses.

During the calibration process, the controller 14 stores the second trimming signal TCO (ITC) in the non-volatile memory 16 if the determination circuit JC determines that the potential of the first relay terminal CIN0 is equal to the potential of the second relay terminal CIN1. When the power is turned on next time, the controller 14 sets the capacitance of the first circuit unit 10A of the capacitance circuit CAP10 based on the second trimming signal TCO (ITC) stored in the memory 16.

As a result, by the calibration described above, it is possible to cancel the parasitic capacitance outside the IC chip 100, and set the capacitance of the capacitance circuit CAP10 to an intermediate level between the capacitance before the dielectric of the sensor capacitor 50 melts and the capacitance after the dielectric has melted. This makes it possible to accurately determine whether the dielectric filled between the electrodes of the sensor capacitor 50 has melted or not.

In this embodiment, the calibration circuit CAL is used to calibrate the capacitance circuit CAP10 (or CAP20, CAP30) to the reference capacitance, which is a threshold value to detect a change in capacitance of the sensor capacitor 50.

However, the calibration operation by the calibration circuit CAL may also be used to detect the capacitance of a capacitor connected to the electrode pads P0 (or P3) and P2. For example, the capacitor subjected to the detection of capacitance is connected to the electrode pads P0 (or P3) and P2, and the calibration operation described above is performed. When the determination circuit JC outputs the H-level flag signal COUT2, the controller 14 takes in the trimming signal ITC<n:0> output from the calibration circuit CAL at that time. That is, the trimming signal ITC<n:0> taken in by the controller 14 at the time when the H-level flag signal COUT2 is output represents the combined capacitance of the capacitors NM20-0 to NM20-$n$ of the capacitance circuit CAP10, and the value thereof equals the capacitance of the capacitors connected to the electrode pads P0 (or P3) and P2. The controller 14 then supplies, to the transmitter-receiver circuit 13, information indicating the capacitance corresponding to the captured trimming signal ITC<n:0> together with the identification ID as transmission information. This causes the sensor tag 150 to wirelessly transmit the information indicating the capacitance of the capacitors connected to the electrode pads P0 (or P3) and P2 and the identification ID to the reader-writer 200 as illustrated in FIG. 3. This way, the reader-writer 200 can wirelessly obtain the capacitance of the capacitors connected to the electrode pads P0 (or P3) and P2 of the sensor tag 150.

Next, the internal operation of the determination circuit JC of FIG. 7 will be explained with reference to the time chart of FIG. 14.

Figure 14:
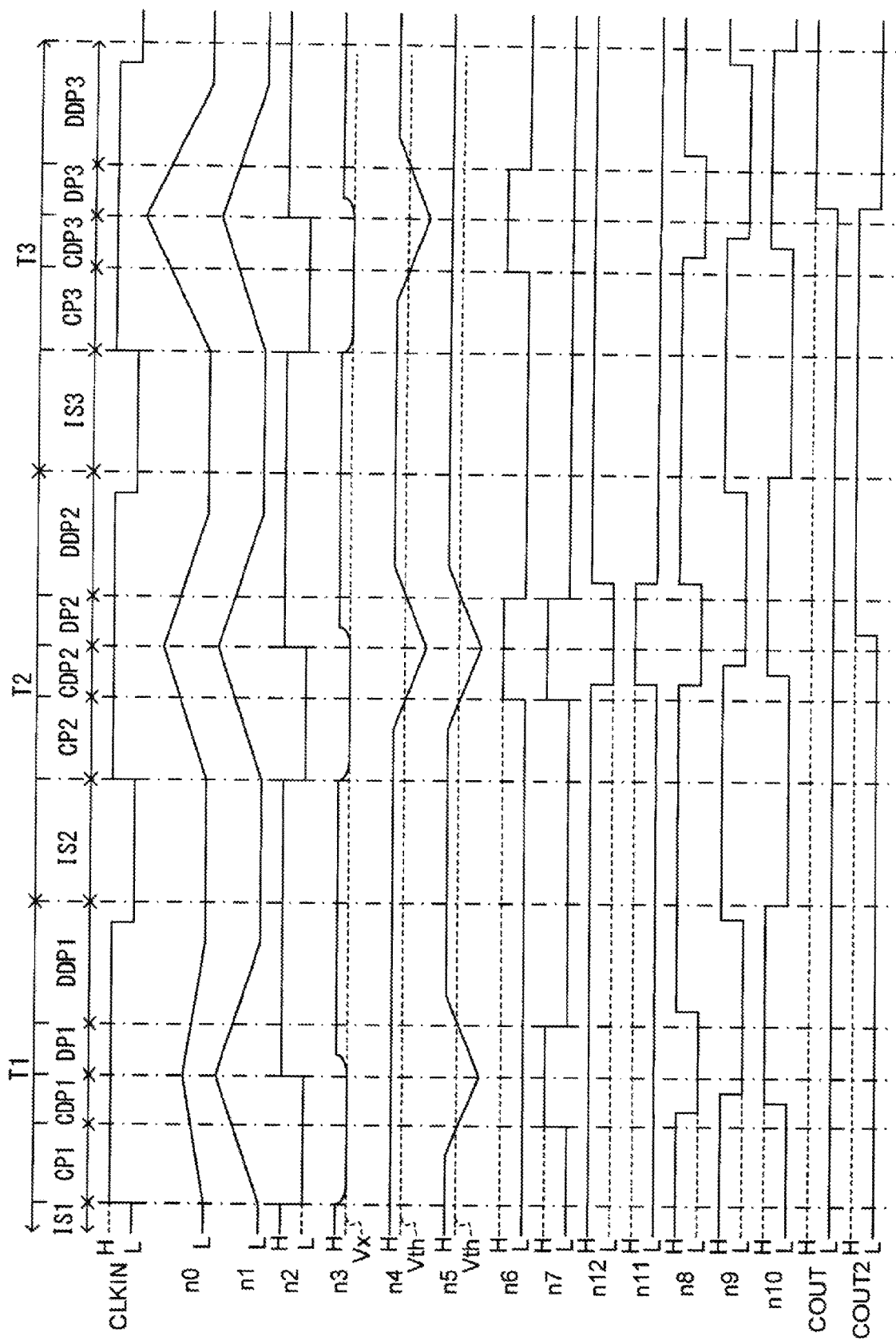
FIG. 14 is a time chart illustrating an internal operation of the determination circuit JC.

In FIG. 14, a period in which the dielectric between the electrodes of the sensor capacitor 50 is not melted is a period T1, a period in which the dielectric is melted to some extent such that the capacitance of the sensor capacitor 50 and the capacitance of the capacitance circuit CAP10 are almost equal to each other is a period T2, and a period in which the dielectric of the sensor capacitor 50 has all been melted is a period T3.

First, the operation during the period T1 will be explained.

[First Initial State IS1]

When the L-level clock signal CLKIN is supplied from the calibration circuit CAL to the determination circuit JC, the potential of the node n2 shown in FIG. 7 is set to the H level. This sets the potentials of the node n0 and the node n1 to the L level, and the potentials of the node n3, the node n4, and the node n5 to the H level. Also, this sets the potentials of the node n6 and the node n7 to the L level, the potential of the node n8 to the H level, the potential of the node n9 to the H level, the potential of the node n10 to the L level, and the potential of the node n11 to the L level. In FIG. 14, this period is labeled as the first initial state IS1.

In the first initial state IS1, because the potential of the node n2 is at the H level, the value of the detection signal COUT output from the first latch circuit LT1 is a value that had been held until the first initial state started. That is, because the dielectric between the electrodes of the sensor capacitor 50 has not melted, the L-level detection signal COUT is output.

Similarly, because the potential of the node n2 is at the H level, the value of the flag signal COUT2 output from the second latch circuit LT2 is a value that had been held until the first initial state started. That is, because the capacitance of the capacitance circuit CAP10 is smaller than the capacitance of the sensor capacitor 50, the L-level flag signal COUT2 is output.

[First Charging Period CP1]

Thereafter, when the clock signal CLKIN changes to the H level, the potential of the node n2 falls to the L level. The potential of the node n2 is inverted by the inverter INV0, and the H-level inverted signal is applied to the gate of the transistor NM9. This causes the bias signal generation unit 32 to operate, and the node n3 has an intermediate potential Vx. As a result, the gate of the transistor NMB, which is the constant current source, receives the bias signal having the level of the intermediate potential Vx.

Because the potential of the node n2 is at the L level, both the transistors NM2 and NM3 are turned off, and both the transistors PM2 and PM3 are turned on. As a result, the determination circuit JC sends a charging current from the relay terminals CIN0 and CIN1 to the sensor capacitor 50 and the capacitance circuit CAP10 via the nodes n0 and n1, respectively, and charges the sensor capacitor 50 and the capacitance circuit CAP10.

Because the dielectric of the sensor capacitor 50 is not melted in the period T1, the capacitance of the sensor capacitor 50 is a prescribed first capacitance, and is greater than the capacitance of the capacitance circuit CAP10 (referred to as a reference capacitance). Thus, the capacitance circuit CAP10 is charged faster than the sensor capacitor 50, and the potential of the node n1 rises before that of the node n0.

The potential of the node n1 is applied to the gate of the transistor NM1, and with the operation of the differential amplifier unit 35, the potential of the node n5 falls. On the other hand, the potential of the node n0 does not rise as fast as the potential of the node n1, and thus, the potential of the node 4 does not fall almost at all by the function of the differential amplifier unit 35. In FIG. 14, this period is labeled as the first charging period CP1.

[First Charging Detection Period CDP1]

Thereafter, when the potential of the node n5 falls to a threshold level Vth of the inverter unit 37, the potential of the node n7 rises to the H level, and the H-level signal is taken in by the first latch circuit LT1. Also, because the potential of the node n6 is at the L level, even if the potential of the node n7 rises to the H level, the potential of the node n12 remains at the H level, and the potential of the node n11 remains at the L level. This causes the H-level signal to be taken in by the second latch circuit LT2. In FIG. 14, this period is labeled as the first charging detection period CDP1.

In the first charging detection period CDP1, the potentials of the nodes n8, n10, and n9 sequentially change at a certain time interval. Specifically, by the potential of the node n7 rising to the H level, the potential of the node n8 falls to the L level. By this change in potential of the node n8, the potential of the node n10 rises to the H level. By this change in potential of the node n10, the potential of the node n9 falls to the L level.

[First Discharging Period DP1]

By the potential of the node n9 falling to the L level, the potential of the node n2 changes to the H level. This causes an H-level signal to be supplied as the clock signal to the clock terminal of the first latch circuit LT1. Because the node n7 is at the H level, the first latch circuit LT1 takes in the H-level signal, and outputs the detection signal COUT, which is an L-level signal obtained by inverting the H-level signal.

Similarly, an H-level signal is supplied as the clock signal to the clock terminal of the first latch circuit LT2. Because the node n12 is at the H level, the first latch circuit LT2 takes in the H-level signal, and outputs the flag signal COUT2, which is an L-level signal obtained by inverting the H-level signal.

By the potential of the node n2 changing to the H level, an L-level inverted signal obtained by inverting the potential of the node n2 is applied to the gate of the transistor NM9. This turns off the bias signal generation unit 32 (or in other words, causes a non-operation state), and the node n3 has an H-level potential. As a result, the gate of the transistor NM8 receives an H-level bias signal, turning on the transistor NM8, which is a constant current source Also, because the transistors NM2 and NM3 are turned on and the transistors PM2 and PM3 are turned off, the sensor capacitor 50 and the capacitance circuit CAP10 are discharged via the relay terminals CIN0 and CIN1. In FIG. 14, this period is labeled as the first discharging period DP1.

[First Discharging Detection Period DDP1]

Thereafter, when the potential of the node n5 rises to the threshold level Vth of the inverter unit 37, the potential of the node n7 changes to the L level, and the potential of the node n8 changes to the H level. Then, the clock signal CLKIN changes to the L level, which causes the potential of the node n9 to change to the H level and the potential of the node n10 to change to the L level. In FIG. 14, this period is labeled as the first discharging detection period DDP1.

Next, an operation in the period T2 (that is, a state in which the dielectric is melted to some extent and the capacitance of the sensor capacitor 50 and the capacitance of the capacitance circuit CAP10 are substantially equal) will be described.

[Second Initial State IS2]

When the L-level clock signal CLKIN is supplied to the determination circuit JC, the potential of the node n2 is at the H level. This sets the potentials of the node n0 and the node n1 to the L level, and the potentials of the node n3, the node n4, and the node n5 to the H level. Also, the potentials of the node n6 and the node n7 are at the L level, the potential of the node n12 is at the H level, the potential of the node n11 is at the L level, the potential of the node n8 is at the H level, the potential of the node n9 is at the H level, and the potential of the node n10 is at the L level. In FIG. 14, this period is labeled as the second initial state IS2.

In the second initial state IS2, because the potential of the node n2 is at the H level, the detection signal COUT output from the first latch circuit LT1 maintains the previous data value, which is the L level. Similarly, the flag signal COUT2 output from the second latch circuit LT2 also maintains the previous data value, which is the L level.

[Second Charging Period CP2]

Thereafter, when the clock signal CLKIN changes to the H level, the potential of the node n2 goes down to the L level. The potential of the node n2 is inverted by the inverter INV0, and the H-level inverted signal is applied to the gate of the transistor NM9. This causes the bias signal generation unit 32 to operate, and the node n3 has an intermediate potential Vx. As a result, the gate of the transistor NM8, which is the constant current source, receives the bias signal having the level of the intermediate potential Vx.

Because the potential of the node n2 is at the L level, both the transistors NM2 and NM3 are turned off, and both the transistors PM2 and PM3 are turned on. As a result, the determination circuit JC sends a charging current from the relay terminals CIN0 and CIN1 to the sensor capacitor 50 and the capacitance circuit CAP10 via the nodes n0 and n1, respectively, and charges the sensor capacitor 50 and the capacitance circuit CAP10.

In the period T2, the dielectric is melted to some extent, and the sensor capacitor 50 and the capacitance circuit CAP10 have substantially the same capacitance (that is, the reference capacitance). Therefore, the sensor capacitor 50 and the capacitance circuit CAP10 are charged almost at the same rate, and the potentials of the node n0 and the node 1 rise as time progresses at substantially the same increase rate (that is, a difference between the respective increase rates does not exceed a prescribed range).

The potential of the node n0 is applied to the gate of the transistor NM0, and with the operation of the differential amplifier unit 35, the potential of the node n4 falls. On the other hand, the potential of the node n1 is applied to the gate of the transistor NM1, and with the operation of the differential amplifier, the potential of the node n5 falls. Because the increase rate of the potentials is substantially the same between the node n0 and the node n1, the potentials of the node n4 and the node n5 decrease at substantially the same decrease rate (that is, a difference in respective decrease rates does not exceed a prescribed range). In FIG. 14, this period is labeled as the second charging period CP2.

[Second Charging Detection Period CDP2]

Thereafter, when the potential of the node n5 falls to the threshold level Vth of the inverter unit 37, the potential of the node n6 changes to the H level. Similarly, when the potential of the node n5 falls to the threshold level Vth of the inverter unit 37, the potential of the node n7 changes to the H level. Because the decrease rate of the potential is substantially the same between the node n4 and the node n5, the potentials of the node n6 and the node n7 reach the H level substantially at the same time.

When the potentials of the node n6 and n7 reach the H level, the potential of the node n9 changes to the L level and the potential of the node n1 changes to the H level. The potentials of the nodes n8, n10, and n9 change sequentially at a certain time interval. Specifically, by the potentials of the node n6 and n7 changing to the H level, and by the potential of the node n11 changing to the H level, the potential of the node n8 falls to the L level. By this change in potential of the node n8, the potential of the node n10 rises to the H level. By this change in potential of the node n10, the potential of the node n9 falls to the L level. In FIG. 14, this period is labeled as the second charging detection period CDP2.

[Second Discharging Period DP2]

Because the clock signal CLKIN is at the H level and the potential of the node n9 is at the L level, the node n2, which is NAND of the two, is at the H level. At this time, the node n7 is at the H level, and therefore, an H-level signal is input into the first latch circuit LT1. As a result, the first latch circuit LT1 outputs, as the detection signal COUT, an L-level inverted signal obtained by inverting the input signal. Also, the node n12 is at the L level, and therefore, an L-level signal is input into the second latch circuit LT2. As a result, the second latch circuit LT2 outputs, as the flag signal COUT, an L-level inverted signal obtained by inverting the input signal.

By the potential of the node n2 changing to the H level, an L-level inverted signal obtained by inverting the potential of the node n2 is applied to the gate of the transistor NM9. This turns off the bias signal generation unit 32 (or in other words, causes a non-operation state), and the node n3 has an H-level potential. As a result, the gate of the transistor NM8 is supplied with an H-level bias signal, turning on the transistor NM8, which is the constant current source. Also, because the transistors NM2 and NM3 are turned on and the transistors PM2 and PM3 are turned off, the sensor capacitor 50 and the capacitance circuit CAP10 are discharged via the relay terminals CIN0 and CIN1. In FIG. 14, this period is labeled as the second discharging period DP2.

[Second Discharging Detection Period DDP2]

Thereafter, when the potential of the node n4 rises to the threshold level Vth of the inverter unit 37, the potential of the node n6 changes to the L level. Similarly, when the potential of the node n5 rises to the threshold level Vth of the inverter unit 37, the potential of the node n7 changes to the L level. This sets the potential of the node n12 to the H level, the potential of the node n11 to the L level, and the potential of the node n8 to the H level. Then, the clock signal CLKIN changes to the L level, which causes the potential of the node n9 to rise to the H level and the potential of the node n10 to fall to the L level. In FIG. 14, this period is labeled as the second discharging detection period DDP2.

Next, the operation of the period T3 (that is, the state in which the dielectric has all melted) will be explained.

[Third Initial State IS3]

When the L-level clock signal CLKIN is supplied to the determination circuit JC, the potential of the node n2 changes to the H level. This sets the potentials of the node n0 and the node n1 to the L level, and the potentials of the node n3, the node n4, and the node n5 to the H level. Also, this sets the potentials of the node n6 and the node n7 to the L level, the potential of the node n12 to the H level, the potential of the node n11 to the L level, the potential of the node n8 to the H level, the potential of the node n9 to the H level, and the potential of the node n10 to the L level. In FIG. 14, this period is labeled as the third initial state IS3.

In the third initial state IS3, because the potential of the node n2 is at the H level, the detection signal COUT output from the first latch circuit LT1 maintains the previous data value, which is the L level. Similarly, the flag signal COUT2 output from the second latch circuit LT2 also maintains the previous data value, which is the L level.

[Third Charging Period CP3]

Thereafter, when the clock signal CLKIN changes to the H level, the potential of the node n2 falls to the L level. The potential of the node n2 is inverted by the inverter INV0, and the H-level inverted signal is applied to the gate of the transistor NM9. This causes the bias signal generation unit 32 to operate, and the node n3 has the intermediate potential Vx. As a result, the gate of the transistor NM8, which is the constant current source, receives the bias signal having the level of the intermediate potential Vx.

Because the potential of the node n2 is at the L level, both the transistors NM2 and NM3 are turned off, and both the transistors PM2 and PM3 are turned on. As a result, the determination circuit JC sends a charging current from the relay terminals CIN0 and CIN1 to the sensor capacitor 50 and the capacitance circuit CAP10 via the nodes n0 and n1, respectively, and charges the sensor capacitor 50 and the capacitance circuit CAP10.

Because the dielectric of the sensor capacitor 50 has melted in the period T3, the capacitance of the sensor capacitor 50 is the second capacitance, and is smaller than the reference capacitance of the capacitance circuit CAP10. Thus, the sensor capacitor 50 is charged faster than the capacitance circuit CAP10, and the potential of the node n0 rises before that of the node n1.

The potential of the node n0 is applied to the gate of the transistor NM0, and with the operation of the differential amplifier unit 35, the potential of the node n4 falls. On the other hand, the potential of the node n1 does not rise as fast as the potential of the node n0, and thus, the potential of the node 5 does not fall almost at all by the function of the differential amplifier unit 35. In FIG. 14, this period is labeled as the third charging period CP3.

[Third Charging Detection Period CDP3]

Thereafter, when the potential of the node n5 falls to the threshold level Vth of the inverter unit 37, the potential of the node n6 rises to the H level. On the other hand, because the potential of the node n5 does not fall, the node n7 remains at the L level, and an L-level signal is input into the first latch circuit LT1. Also, because the potential of the node n7 is at the L level, even if the potential of the node n6 rises to the H level, the potential of the node n12 remains at the H level, and the potential of the node n11 remains at the L level. In FIG. 14, this period is labeled as the third charging detection period CDP3.

In the third charging detection period CDP3, the potentials of the nodes n8, n10, and n9 sequentially change at a certain time interval. Specifically, by the potential of the node n6 rising to the H level, the potential of the node n8 falls to the L level. By this change in potential of the node n8, the potential of the node n10 rises to the H level. By this change in potential of the node n10, the potential of the node n9 falls to the L level.

[Third Discharging Period DP3]

By the potential of the node n9 falling to the L level, the potential of the node n2 rises to the H level. This causes an H-level signal to be supplied as the clock signal to the clock terminal of the first latch circuit LT1. Because the node n7 is at the L level, the first latch circuit LT1 takes in the L-level signal, and outputs, as the detection signal COUT, an H-level signal obtained by inverting the L-level signal.

Similarly, an H-level signal is supplied as the clock signal to the clock terminal of the first latch circuit LT2. Because the node n12 is at the H level, the second latch circuit LT2 takes in the H-level signal, and outputs, as the flag signal COUT2, an L-level inverted signal obtained by inverting the H-level signal.

By the potential of the node n2 changing to the H level, an L-level inverted signal obtained by inverting the potential of the node n2 is applied to the gate of the transistor NM9. This turns off the bias signal generation unit 32 (or in other words, causes a non-operation state), and the node n3 has an H-level potential. As a result, an H-level bias signal is supplied to the gate of the transistor NM8, turning on the transistor NM8, which is the constant current source. Also, because the transistors NM2 and NM3 are turned on and the transistors PM2 and PM3 are turned off, the sensor capacitor 50 and the capacitance circuit CAP10 are discharged via the relay terminals CIN0 and CIN1. In FIG. 14, this period is labeled as the third discharging period DP3.

[Third Discharging Detection Period DDP3]

Thereafter, when the potential of the node n4 rises to the threshold level Vth of the inverter unit 37, the potential of the node n6 falls to the L level, and the potential of the node n8 rises to the H level. Then, the clock signal CLKIN falls to the L level, which causes the potential of the node n9 to rise to the H level and the potential of the node n10 to fall to the L level. In FIG. 14, this period is labeled as the third discharging detection period DDP3.

As described above, when the dielectric between the electrodes of the externally connected sensor capacitor 50 has not melted, the determination circuit JC outputs the L-level detection signal COUT and the L-level flag signal COUT2. When the dielectric has melted to some extent, and the capacitance of the sensor capacitor 50 and the capacitance of the capacitance circuit CAP10 are substantially the same, the determination circuit JC outputs the L-level detection signal COUT and the H-level flag signal COUT2. When the dielectric has all melted, the determination circuit JC outputs the H-level detection signal COUT and the L-level flag signal COUT2.

Thus, with the capacitance sensor circuit 15, it is possible to obtain information that indicates whether the dielectric of the externally connected sensor capacitor 50 has melted or not, or in other words, whether the capacitance of the sensor capacitor 50 has changed or not (COUT). Also, with the capacitance sensor circuit 15, it is possible to obtain information that indicates whether the capacitance is substantially the same between the sensor capacitor 50 and the capacitance circuit CAP10 or not (COUT2).

In the capacitance sensor circuit 15, an electric current is consumed only during the first charging period CP1, the first charging detection period CDP1, the second charging period CP2, the second charging detection period CDP2, the third charging period CP3, and the third charging detection period CDP3 shown in FIG. 14, and no electric current is consumed during any other periods. Therefore, even when the capacitance of the sensor capacitor 50 is substantially the same as the capacitance of the capacitance circuit CAP10, by setting the clock signal CLKIN to a low frequency, the current consumption of the entire circuit can be suppressed.

That is, with the capacitance sensor circuit 15 equipped with the determination circuit JC of FIG. 7, even when the capacitance of the sensor capacitor 50 and the capacitance of the capacitance circuit CAP10 are substantially equal to each other, the information about the capacitance of the sensor capacitor 50 can be transmitted to the reader-writer device 200 without increasing the electric current. Also, the information indicating whether the capacitance is substantially the same between the sensor capacitor 50 and the capacitance circuit CAP10 or not can be transmitted to the reader-writer device 200.

Even when a capacitor with a relatively large capacitance is externally connected to the electrode pads P2 and P3 as the sensor capacitor 50, by using the capacitance circuit CAP20, the calibration operation of FIG. 13 and the detection process of FIG. 14 can be performed in a manner similar to a case in which the capacitance circuit CAP10 described above is used.

Figure 15:
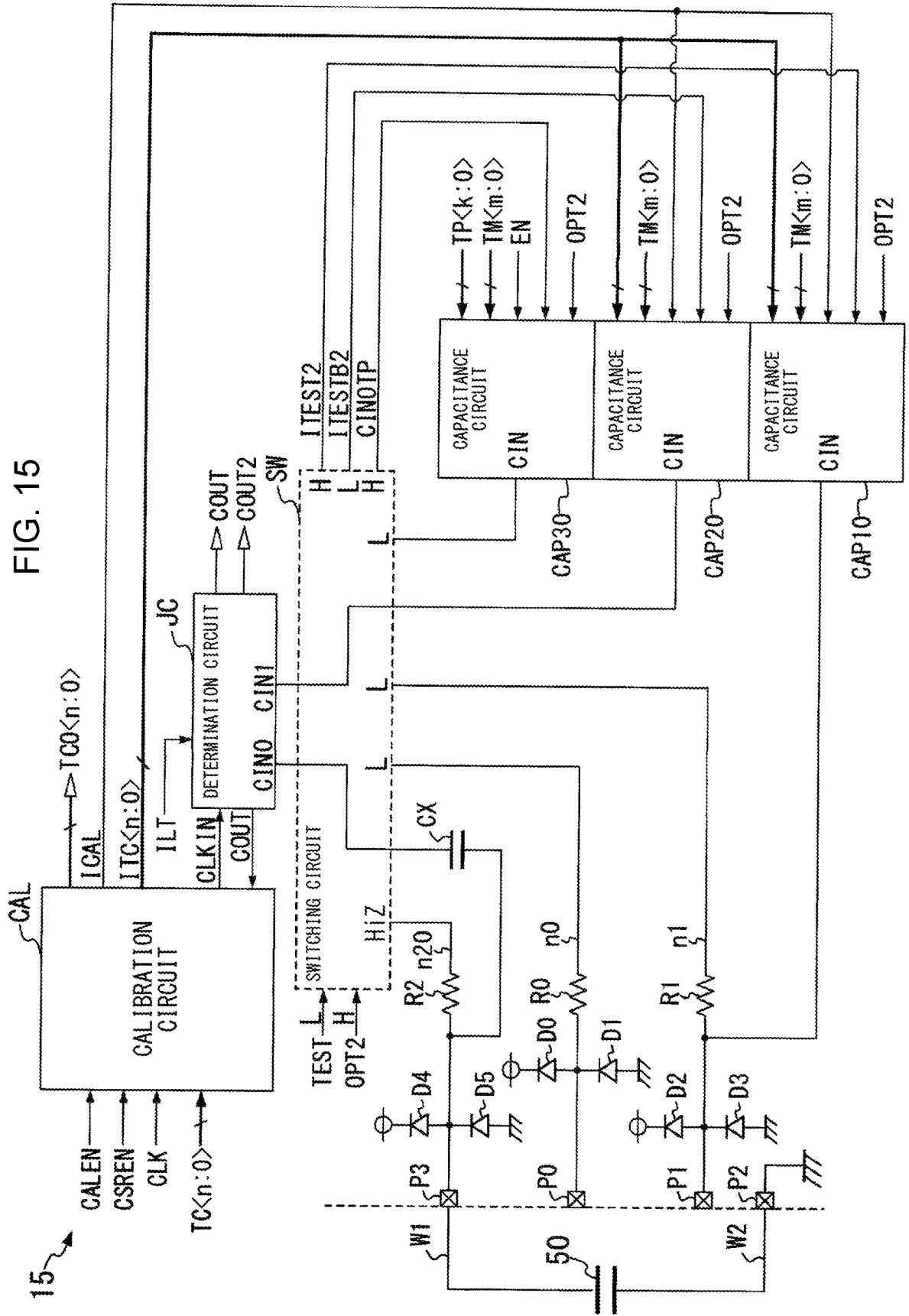
FIG. 15 is a block diagram illustrating the state of the capacitance sensor circuit 15 when the sensor capacitor 50 is connected to electrode pads P3 and P2.

FIG. 15 is a block diagram illustrating the state of the capacitance sensor circuit 15 when the sensor capacitor 50 with a relatively large capacitance is connected to the electrode pads P2 and P3.

The controller 14 supplies the L-level test mode signal TEST to the switching circuit SW, and supplies the L-level leak test signal ILT to the determination circuit JC. Furthermore, the controller 14 supplies the H-level switching signal OPT2 that selects CAP20 from the capacitance circuits CAP10 and CAP20 to the switching circuit SW and the capacitance circuits CAP10, CAP20, and CAP30, respectively.

As a result, as illustrated in FIG. 15, the switching circuit SW connects the electrode W1 of the sensor capacitor 50 to the relay terminal CIN0 of the determination circuit JC via the auxiliary capacitor CX and the electrode pad P3. The switching circuit SW also connects the capacitance connection terminal CIN of the capacitance circuit CAP20 to the relay terminal CIN1 of the determination circuit JC.

As illustrated in FIG. 15, the switching circuit SW brings the node n20 into the high impedance (HiZ) state, and supplies an L-level signal to the node n0, the node n1, and the capacitance connection terminal CIN of the capacitance circuit CAP30.

The determination circuit JC, in comparing the potential of the electrode of the sensor capacitor 50 with the potential of the capacitance connection terminal CIN of the capacitance circuit CAP20, charges the sensor capacitor 50 in each of the first to third charging periods CP1 to CP3 of FIG. 14.

The greater the capacitance of the sensor capacitor 50, the greater the current consumption in the charging operation. Furthermore, if the sensor capacitor 50 and the parasitic capacitance outside the IC chip 100 are charged at a faster rate, the power supply voltage generated in the power supply circuit 12 lowers, which possibly causes malfunction.

In order to solve the problem, the capacitance sensor circuit 15 is equipped with the auxiliary capacitor CX between the electrode pad P3 connected to one electrode W1 of the sensor capacitor 50 having a relatively large capacitance and the input terminal CIN0M2 of the switching circuit SW, the auxiliary capacitor CX being connected to the sensor capacitor 50 in series.

The determination circuit JC supplies the charging current sent from the relay terminal CIN0 thereof to the auxiliary capacitor CX, and supplies the charging current sent from the relay terminal CIN1 to the capacitance circuit CAP20 in each of the first to third charging periods CP1 to CP3 of FIG. 14. As a result, the capacitance circuit CAP20 is charged, and at the same time, the auxiliary capacitor CX and the sensor capacitor 50 connected in series via the electrode pad P3 are charged.

Figure 16:
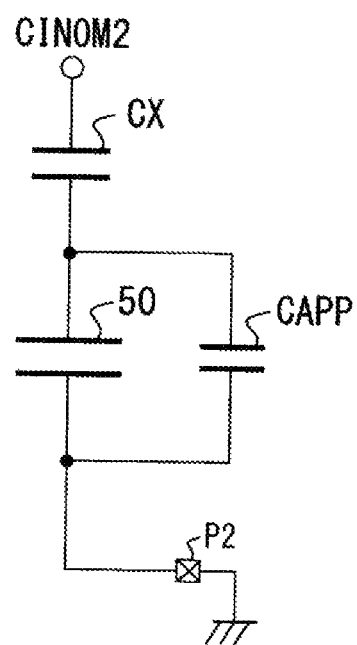
FIG. 16 is an equivalent circuit diagram of circuits provided between the electrode pad P2 and an input terminal CIN0M2 of the switching circuit SW.

FIG. 16 is an equivalent circuit diagram of the circuit provided between the electrode pad P2 and an input terminal CIN0M2 of the switching circuit SW. CAPP in FIG. 16 is a combined parasitic capacitance combining respective parasitic capacitances of the diodes D4 and D5, the resistor R2, and the electrode pad P3 illustrated in FIG. 15.

Thus, in the equivalent circuit of FIG. 16, the combined capacitance CAPT viewed from the input terminal CIN0M2 of the switching circuit SW is:

$$CAPT=(CAP1+CAP2) \cdot CAP2/(CAP1+CAPP+CAP2),$$

where CAP1 is the capacitance of the sensor capacitor 50,
CAP2 is the capacitance of the auxiliary capacitor CX, and
CAPP is the combined parasitic capacitance of P3, R2, D4, and D5.

This way, even if the capacitance CAP1 of the sensor capacitor 50 is large, by reducing the capacitance CAP2 of the auxiliary capacitor CX connected in series thereto, the combined capacitance CAPT can be reduced.

Therefore, even if the capacitance CAP1 of the sensor capacitor 50 externally connected to the IC chip 100 is relatively large, the calibration process and capacitance detection process can be performed without increasing the consumption current for charging the combined capacitance CAPT.

Next, a test operation to internally check whether or not the detection operation and calibration by the capacitance sensor circuit 15 are normally performed in the IC chip by itself will be explained.

Figure 17:
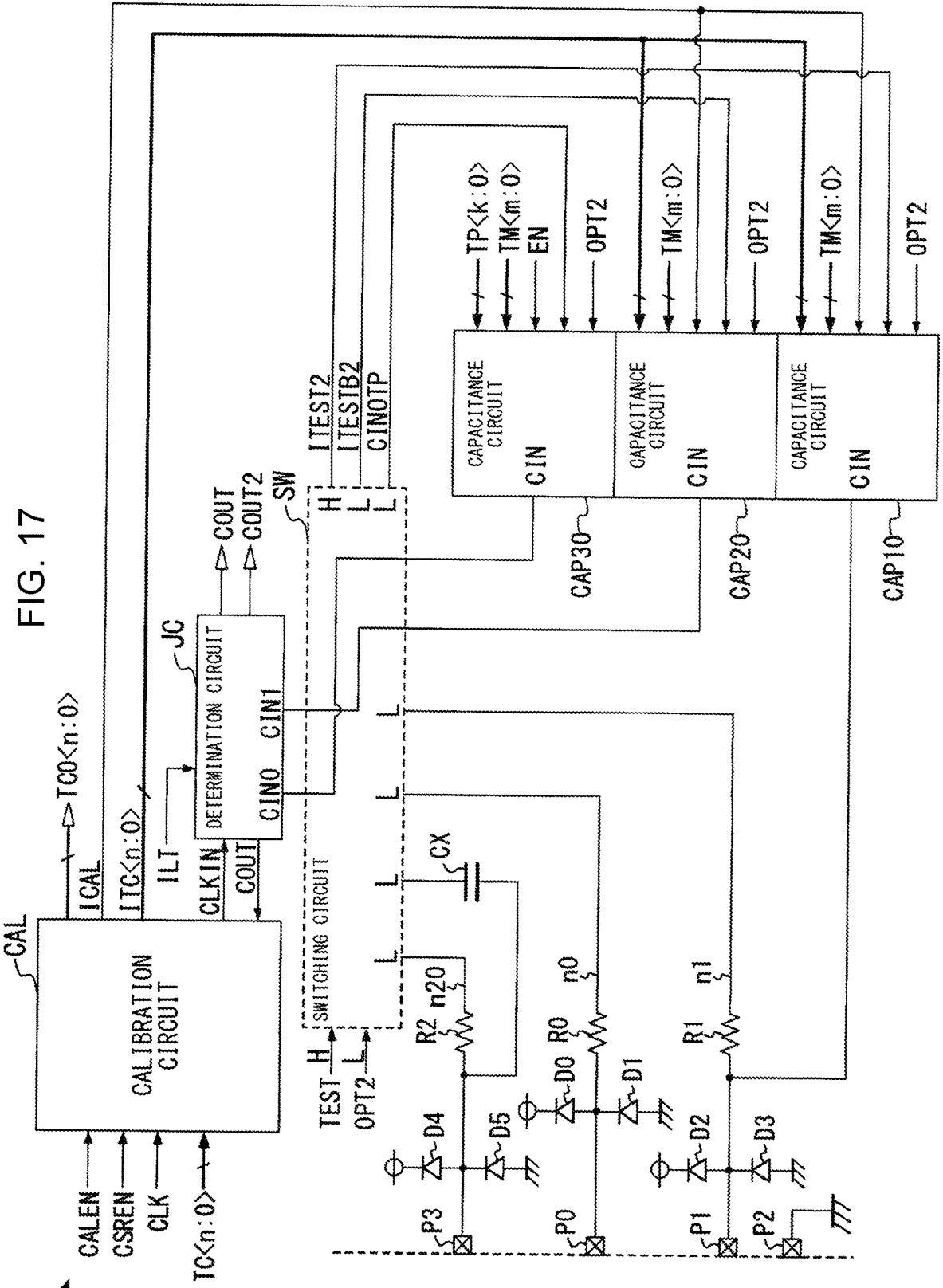
FIG. 17 is a block diagram illustrating the state of the capacitance sensor circuit 15 in a test mode.

FIG. 17 is a block diagram illustrating the state of the capacitance sensor circuit 15 in this test mode.

In performing this test. the controller 14 supplies the H-level test mode signal TEST to the switching circuit SW, and supplies the L-level leak test signal ILT to the determination circuit JC. The controller 14 also supplies the H-level or L-level enable signal EN to the capacitance circuit CAP30. Furthermore, the controller 14 supplies the L-level switching signal OPT2 to the switching circuit SW and the capacitance circuits CAP10, CAP20, and CAP30, respectively.

As a result, the switching circuit SW connects the capacitance connection terminal CIN of the capacitance circuit CAP30 to the relay terminal CIN0 of the determination circuit JC and the capacitance connection terminal CIN of the capacitance circuit CAP20 to the relay terminal CIN1 of the determination circuit JC as illustrated in FIG. 17. Furthermore, the switching circuit SW supplies the H-level test signal ITEST2 to the capacitor circuit CAP10, supplies the L-level inverted test signal ITESTB2 to the capacitor circuit CAP20, and supplies the L-level signal CIN0TP to the capacitor circuit CAP30.

By receiving the L-level inverted test signal ITESTB2, the selection signals ITX<0> to ITX<n> of the capacitance circuit CAP20 shown in FIG. 10 have the same phase as the selection signals ITC<0> to ITC<n>, which are the trimming signals. The selection signals ITM<0> to ITM<m> shown in FIG. 10 are NAND signals of the control signal ICAL for controlling the calibration operation and the margin trimming signal TM<m:0> (that is, the selection signal TM<0> to TM<m>).

Furthermore, by receiving the L-level signal CIN0TP, the selection signals ITP<k:0> (that is, the selection signals ITP<0> to ITP<k>) of the capacitance circuit CAP30 shown in FIG. 11 have the same phase as the capacitance value selection signal TP<k:0> (that is, the selection signals TP<0> to TP<k>).

In this state, if the H-level enable signal EN, the capacitance value selection signal TP<k:0> taking into consideration the external parasitic capacitance of the IC chip 100, and the margin trimming signal TM<m:0> that sets the capacitance of the capacitance circuit CAP30 to a half of the difference between the capacitance before the dielectric melts and the capacitance after the dielectric has melted are supplied to the capacitance circuit CAP30, because the enable signal EN is at the H level, and the switching signal OPT2 is at the L level, ITM<m:0> and TM<m:0> of FIG. 11 have the same phase. When the capacitance of the capacitors CAP50-0 to 50-m of FIG. 11 is set to be twice as much as the capacitance of the capacitors CAP30-0 to 30-m of FIG. 10, the capacitors 50-0 to 50-m have a capacitance corresponding to the difference in capacitance between before and after the dielectric is melted in the sensor capacitor 50.

The calibration described above is performed by the calibration circuit CAL in this state, and the trimming signal TCO<n:0> is set such that the capacitance of the capacitance circuit CAP20 equals the capacitance of the capacitance circuit CAP30. The controller 14 supplies the data of TCO<n:0> at this point to the calibration circuit CAL as TC<n:0>. Furthermore, the controller 14 supplies the H-level sensor enable signal CSREN and the L-level calibration enable signal CALEN to the calibration circuit CAL. Because the calibration enable signal CALEN is at the L level, the control signal ICAL is at the L level, and ITM<m:0> of FIG. 10 is also at the L level. All the capacitors CAP30-0 to 30-m do not function as the capacitance, and therefore, the capacitance of the capacitance circuit CAP20 is set to a value obtained by subtracting a capacitance corresponding to a half of the difference in capacitance between before and after the dielectric of the sensor capacitor 50 is melted, from the capacitance of the capacitance circuit CAP30.

Then when the controller 14 supplies the L-level enable signal EN to the capacitance circuit CAP30, ITM<m:0> of FIG. 11 are all set to the L level, which causes the capacitors CAP50-0 to 50-*m* not to function as a capacitance. Therefore, the capacitance of the capacitance circuit CAP30 is set to a value obtained by subtracting a capacitance corresponding to a half of the difference in capacitance between before and after the dielectric of the sensor capacitor 50 is melted, from the capacitance of the capacitance circuit CAP20.

That is, with the H-level enable signal EN, the L-level switching signal OPT2, and the H-level control signal ICAL, it is possible to verify the operation of the capacitance sensor circuit 15 with the capacitance of the capacitance circuit CAP 20 being reduced by a half of the difference in capacitance between before and after the dielectric of the sensor capacitor 50 is melted.

Also, with the L-level enable signal EN, the L-level switching signal OPT2, and the L-level control signal ICAL, it is possible to verify the operation of the capacitance sensor circuit 15 with the capacitance of the capacitance circuit CAP20 being reduced by a half of the difference in capacitance between before and after the dielectric of the sensor capacitor 50 is melted.

As described above, with the capacitance sensor circuit 15 of this embodiment, it is possible to check whether or not the calibration operation and detection operation are normally performed in a state where the sensor capacitor 50, which is the detection target, is not externally connected to the IC chip 100, or in other words, in a wafer stage of the IC chip 100, for example.

Next, the leak test mode of the capacitance sensor circuit 15 will be explained.

In the leak test mode, the controller 14 supplies the H-level leak test signal ILT to the determination circuit JC. At this time, the inverted signal IILTB in the determination circuit JC illustrated in FIG. 7 is at the L level, and the control signal IILT is at the H level.

As a result, the transistor PM6 shown in FIG. 7 is supplied with the H-level control signal IILT at the gate thereof, and is thereby turned off. The transistor NM13 is supplied with the H-level control signal IILT at the gate thereof, and is thereby turned on.

The transistor NM11 is supplied with the L-level inverted signal IILTB at the gate thereof, and is thereby turned off. The transistor NM12 is supplied with the L-level inverted signal IILTB at the gate thereof, and is thereby turned off.

This causes the node n0 and the node n1 illustrated in FIG. 5 to be in a high impedance state. Also, the potential of the node n3 illustrated in FIG. 7 falls to the L level.

By the potential of the node n3 changing to the L level, the transistor NM8 is turned off. This prevents an electric current from flowing through the bias signal generation unit 32 and the differential amplifier unit 35. This period is the leak test mode.

As described above, in the leak test mode, the controller 14 supplies the H-level leak test signal ILT to the determination circuit JC, so that the node n0 or n20, to which the sensor capacitor 50 is connected, and the node n1, to which the capacitance circuit CAP10 is connected, are brought into the high impedance state. Therefore, it is possible to perform a screening test for detecting a short-circuit defect or the like of the electrode pad P0 or P3 in the test process after manufacturing the IC chip 100.

The switching circuit SW of the embodiment described above may have any circuit configurations as long as the operation illustrated in FIG. 6 can be performed.

In the embodiment described above, different electrode pads (P0 and P3) are provided to connect to one electrode W1 of the sensor capacitor 50, one of the pads being used when the sensor capacitor 50 externally connected to the IC chip 100 has a relatively large capacitance, and the other of the pads being used when the sensor capacitor 50 has a relatively small capacitance. However, a common electrode pad may alternatively be used. In this case, a switch may be connected to the common electrode pad in the IC chip 100, for example, and with this switch, the common electrode pad is connected to one end of the resistor R or one end of the resistor R0, based on the switching signal OPT2.

In the embodiment described above, the IC chip 100 includes the auxiliary capacitor CX connected in series to the sensor capacitor 50 externally connected to the IC chip 100. However, this auxiliary capacitor CX may be provided outside the IC chip 100, and connected to the sensor capacitor 50 in series.

Figure 18:
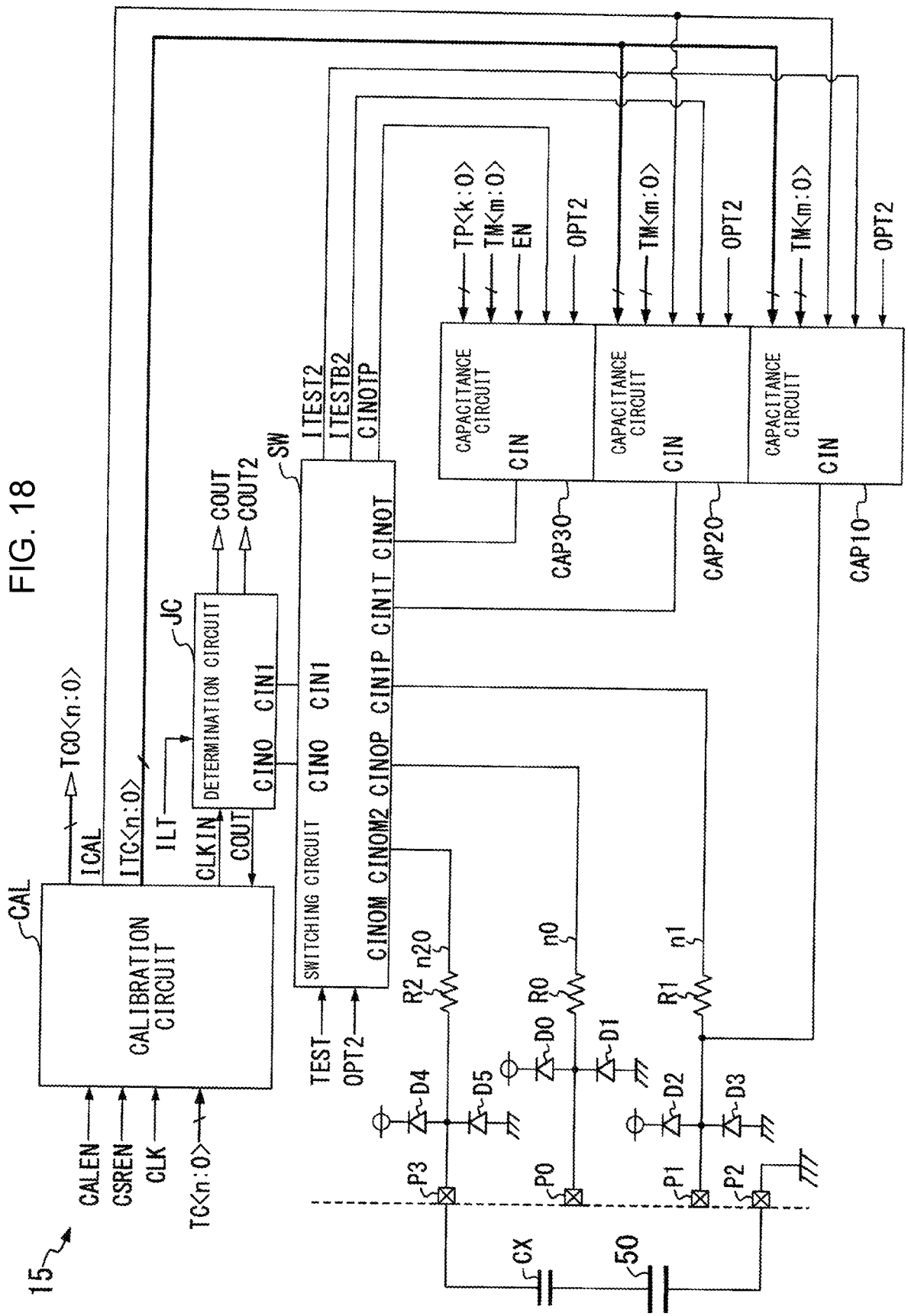
FIG. 18 is a block diagram showing another configuration of the capacitance sensor circuit 15.

FIG. 18 is a block diagram showing another configuration of the capacitance sensor circuit 15 in view of such a point. The configuration of FIG. 18 is the same as that of FIG. 5 except that the auxiliary capacitor CX that was formed inside the IC chip 100 in FIG. 5 is removed and the node n20 connected to the resistor R2 is connected to the input terminal CIN0M2 of the switching circuit SW. That is, in this configuration, the electrode pad P3 is provided as a special electrode pad for externally connecting the auxiliary capacitor CX that is connected to the sensor capacitor 50 in series outside the IC chip 100 as illustrated in FIG. 18, the auxiliary capacitor CX being provided to reduce the capacitance.

In the embodiment described above, the sensor capacitor 50 is configured such that the capacitance thereof reduces when the ambient temperature exceeds the melting point of wax, which is used for the dielectric. However, the sensor capacitor 50 may alternatively be configured such that the capacitance increases when the ambient temperature exceeds the melting point of the wax.

Instead of the wax, a material that changes from solid to liquid irreversibly in response to temperatures, vibration, or the like may be used for the dielectric of the sensor capacitor 50.

For example, if the dielectric changes irreversibly from solid to liquid when the dielectric is exposed to an environment of a prescribed humidity or higher, or a humidity lower than the prescribed humidity, the humidity change can be detected as an environmental change. If the dielectric changes irreversibly from solid to liquid in response to vibration having a magnitude equal to or greater than a prescribed level, the vibration can be detected as an environmental change.

That is, the IC chip 100 (semiconductor device) that includes the capacitance sensor circuit 15 needs to be equipped with the first and second electrode pads, a capacitor, a capacitance circuit, and a determination unit described above, That is, the first electrode pad and the second electrode pad are for externally connecting a first electrode and a second electrode (W1, W2) of a sensor capacitor (50) that changes capacitance thereof according to environmental changes.

The capacitor (CX) has one of a pair of electrodes connected to the first electrode pad. The capacitance circuit (CAP20) has a reference capacitance.

The determination circuit (JC) includes first and second relay terminals (CIN0, CIN1), and sends a charging current from the first relay terminal (CIN0) to the other one of a pair of electrodes of the capacitor (CX), and supplies a charging current from the second relay terminal (CIN1) to the capacitance circuit (CAP20). The determination circuit (JC) then compares the size of the potential of the first relay terminal (CIN0) with the size of the potential of the second relay terminal (CIN1), and based on the comparison result, determines whether the capacitance of the sensor capacitor (50) has changed or not.

What is claimed is:

1. A semiconductor device, comprising:
   a first electrode pad and a second electrode pad for externally connecting a first electrode and a second electrode of a sensor capacitor that has a capacitance that changes according to an environmental change;
   a capacitor having a pair of electrodes, one of the pair of electrodes being connected to the first electrode pad;
   a capacitance circuit having a reference capacitance that supplies a threshold value for determining whether or not the capacitance of the sensor capacitor has changed; and
   a determination circuit that includes a first relay terminal and a second relay terminal,
   wherein the determination circuit is configured to: send a charging current from the first relay terminal to another of the pair of electrodes of the capacitor; compare a size of a potential of the first relay terminal and a size of a potential of the second relay terminal; and determine whether the capacitance of the sensor capacitor has changed or not based on a comparison result.

2. The semiconductor device according to claim 1, wherein the capacitance circuit includes a first circuit unit that is connected to a common line electrically connected to the second relay terminal and that has a variable capacitance, and a second circuit unit that is connected to the common line and that has a variable capacitance,
   wherein the semiconductor device further comprises: a controller that supplies, to the second circuit unit, a first trimming signal that sets the capacitance of the second circuit unit to a margin capacitance; and a calibration circuit that performs calibration to supply, to the first circuit unit, a second trimming signal that sets the capacitance of the first circuit unit to a capacitance that gradually changes as time progresses, and
   wherein the controller is configured to store the second trimming signal in a non-volatile memory when the determination circuit determines that a potential of the first relay terminal is equal to a potential of the second relay terminal during the calibration, and set the capacitance of the first circuit unit when power is turned back on based on the second trimming signal stored in the memory.

3. The semiconductor device according to claim 1, wherein the environmental change corresponds to a change in an ambient temperature from a level lower than a prescribed temperature to a level equal to or higher than the prescribed temperature, and
   wherein a dielectric between the pair of electrodes in the sensor capacitor is wax having a melting point at the prescribed temperature.

4. A semiconductor device, comprising:
   a first electrode pad and a second electrode pad for externally connecting two electrodes at ends of a series circuit in which a sensor capacitor that has a capacitance that changes according to an environmental change and a first capacitor are connected in series;
   a capacitance circuit having a reference capacitance that supplies a threshold value for determining whether or not the capacitance of the sensor capacitor has changed; and
   a determination circuit that includes a first relay terminal and a second relay terminal,
   wherein the determination circuit is configured to: send a charging current from the first relay terminal to one of the two electrodes at the ends of the series circuit; compare a size of a potential of the first relay terminal and a size of a potential of the second relay terminal; and determine whether a capacitance of the sensor capacitor has changed or not based on a comparison result.

5. The semiconductor device according to claim 4, wherein the capacitance circuit includes a first circuit unit that is connected to a common line electrically connected to the second relay terminal and that has a variable capacitance, and a second circuit unit that is connected to the common line and that has a variable capacitance,
   wherein the semiconductor device further comprises: a controller that supplies, to the second circuit unit, a first trimming signal that sets the capacitance of the second circuit unit to a margin capacitance; and a calibration circuit that performs calibration to supply, to the first circuit unit, a second trimming signal that sets the capacitance of the first circuit portion to a capacitance that gradually changes as time progresses, and
   wherein the controller is configured to store the second trimming signal in a non-volatile memory when the determination circuit determines that a potential of the first relay terminal is equal to a potential of the second relay terminal during the calibration, and set the capacitance of the first circuit unit when power is turned back on based on the second trimming signal stored in the memory.

6. The semiconductor device according to claim 4, wherein the environmental change corresponds to a change in an ambient temperature from a level lower than a prescribed temperature to a level equal to or higher than the prescribed temperature, and
   wherein a dielectric between the pair of electrodes in the sensor capacitor is wax having a melting point at the prescribed temperature.

7. A capacitance sensor device for sensing a capacitance change indicative of an environmental change, comprising:
   a sensor capacitor that changes a capacitance according to the environmental change;
   a capacitor having a pair of electrodes, one of the pair of electrodes being connected to one electrode of the sensor capacitor;
   a capacitance circuit having a reference capacitance that supplies a threshold value for determining whether or not the capacitance of the sensor capacitor has changed; and
   a determination circuit that includes a first relay terminal and a second relay terminal,
   wherein the determination circuit is configured to: send a charging current from the first relay terminal to another of the pair of electrodes of the capacitor; compare a size of a potential of the first relay terminal and a size of a potential of the second relay terminal; and determine whether a capacitance of the sensor capacitor has changed or not based on a comparison result.

8. The capacitance sensor device according to claim 7, wherein the capacitance circuit includes a first circuit unit that is connected to a common line electrically connected to the second relay terminal and that has a variable capacitance, and a second circuit unit that is connected to the common line and that has a variable capacitance, wherein the semiconductor device further comprises: a controller that supplies, to the second circuit unit, a first trimming signal that sets the capacitance of the second circuit unit to a margin capacitance; and a calibration circuit that performs calibration to supply, to the first circuit unit, a second trimming signal that sets the capacitance of the first circuit unit to a capacitance that gradually changes as time progresses, and wherein the controller is configured to store the second trimming signal in a non-volatile memory when the determination circuit determines that a potential of the first relay terminal is equal to a potential of the second relay terminal during the calibration, and set the capacitance of the first circuit unit when power is turned back on based on the second trimming signal stored in the memory.

9. The capacitance sensor device according to claim 7, wherein the environmental change corresponds to a change in an ambient temperature from a level lower than a prescribed temperature to a level equal to or higher than the prescribed temperature, and wherein a dielectric between the pair of electrodes in the sensor capacitor is wax having a melting point at the prescribed temperature.

10. The semiconductor device according to claim 2, wherein the environmental change corresponds to a change in an ambient temperature from a level lower than a prescribed temperature to a level equal to or higher than the prescribed temperature, and wherein a dielectric between the pair of electrodes in the sensor capacitor is wax having a melting point at the prescribed temperature.

11. The semiconductor device according to claim 5, wherein the environmental change corresponds to a change in an ambient temperature from a level lower than a prescribed temperature to a level equal to or higher than the prescribed temperature, and wherein a dielectric between the pair of electrodes in the sensor capacitor is wax having a melting point at the prescribed temperature.

12. The capacitance sensor device according to claim 8, wherein the environmental change corresponds to a change in an ambient temperature from a level lower than a prescribed temperature to a level equal to or higher than the prescribed temperature, and wherein a dielectric between the pair of electrodes in the sensor capacitor is wax having a melting point at the prescribed temperature.

\* \* \* \* \*